(12) United States Patent
Maeda et al.

(10) Patent No.: US 12,292,742 B2
(45) Date of Patent: May 6, 2025

(54) INFORMATION PROCESSING METHOD AND INFORMATION PROCESSOR

(71) Applicant: SONY GROUP CORPORATION, Tokyo (JP)

(72) Inventors: Keisuke Maeda, Tokyo (JP); Tatsuya Ishizuka, Tokyo (JP); Mitsuru Nakada, Tokyo (JP); Dai Kobayashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 89 days.

(21) Appl. No.: 17/802,962

(22) PCT Filed: Feb. 25, 2021

(86) PCT No.: PCT/JP2021/007151
§ 371 (c)(1),
(2) Date: Aug. 28, 2022

(87) PCT Pub. No.: WO2021/177139
PCT Pub. Date: Sep. 10, 2021

(65) Prior Publication Data
US 2023/0107289 A1 Apr. 6, 2023

(30) Foreign Application Priority Data
Mar. 6, 2020 (JP) ................. 2020-039276

(51) Int. Cl.
*G05D 1/00* (2024.01)
(52) U.S. Cl.
CPC ......... *G05D 1/0246* (2013.01); *G05D 1/0212* (2013.01); *G05D 1/0274* (2013.01)

(58) Field of Classification Search
CPC .. G05D 1/0246; G05D 1/0212; G05D 1/0274; G05D 1/0094; G01C 21/20; G08G 1/09
See application file for complete search history.

(56) References Cited

U.S. PATENT DOCUMENTS

2016/0004795 A1 1/2016 Novak
2019/0050005 A1* 2/2019 Kenneally .............. G05D 17/02

FOREIGN PATENT DOCUMENTS

JP 2003-266347 A 9/2003
JP 2007-015037 A 1/2007
(Continued)

OTHER PUBLICATIONS

International Search Report and Written Opinion of PCT Application No. PCT/JP2021/007151, issued on May 18, 2021, 10 pages of ISRWO.

(Continued)

*Primary Examiner* — Yuen Wong
(74) *Attorney, Agent, or Firm* — CHIP LAW GROUP

(57) ABSTRACT

There is provided an information processing method of the present disclosure includes performing processing to receive, on a predetermined coordinate system, input information including multiple scheduled points of shooting by a camera provided in a mobile body and information on respective camera attitudes at the multiple scheduled shooting points. The information processing method further includes performing processing to create a prior trajectory of the mobile body on a basis of the received input information.

9 Claims, 20 Drawing Sheets

(56) References Cited

FOREIGN PATENT DOCUMENTS

| | | |
|---|---|---|
| JP | 2010202178 A | 9/2010 |
| JP | 2012-059176 A | 3/2012 |
| JP | 2012-185752 A | 9/2012 |
| JP | 2016-095841 A | 5/2016 |
| JP | 2017173966 A | 9/2017 |
| JP | 2017208678 A | 11/2017 |
| JP | 2018-039420 A | 3/2018 |
| JP | 2018-509676 A | 4/2018 |
| JP | 2018535487 A | 11/2018 |
| JP | 2019032234 A | 2/2019 |
| JP | 2020-135327 A | 8/2020 |
| WO | 2018/193574 A1 | 10/2018 |
| WO | WO-2018198281 A | 11/2018 |
| WO | 2019/171824 A1 | 9/2019 |

OTHER PUBLICATIONS

"Use Waypoint 2.0 with DJI GO 4 and Enjoy Automatic Drone Flight!", Drone Guide, Feb. 19, 2019, 13 pages.

Tassa, et al., "Control-Limited Differential Dynamic Programming", IEEE, International Conference on Robotics and Automation (ICRA), May 31-Jun. 7, 2014, 08 pages.

Alberto Elfes, "Using occupancy grids for mobile robot perception and navigation", Computer, ResearchGate, Jul. 1989, pp. 46-57.

Rusu, et al., "3D is here: Point Cloud Library (PCL)", IEEE, International Conference on Robotics and Automation (ICRA), May 9-13, 2011, 04 pages.

Paden, et al., "A Survey of Motion Planning and Control Techniques for Self-driving Urban Vehicles", Arxiv, Cornell University, Apr. 25, 2016, 27 pages.

How to use the way point 2.0 by a camera and DJI GO—I will enjoy the automatic flight of a drone!

\* cited by examiner

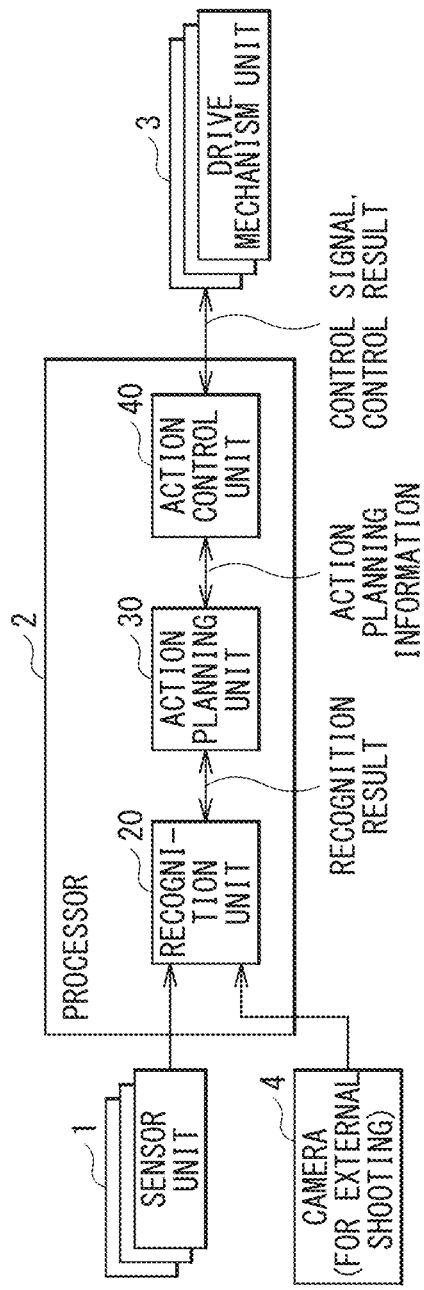
[FIG. 1]

[FIG. 2]
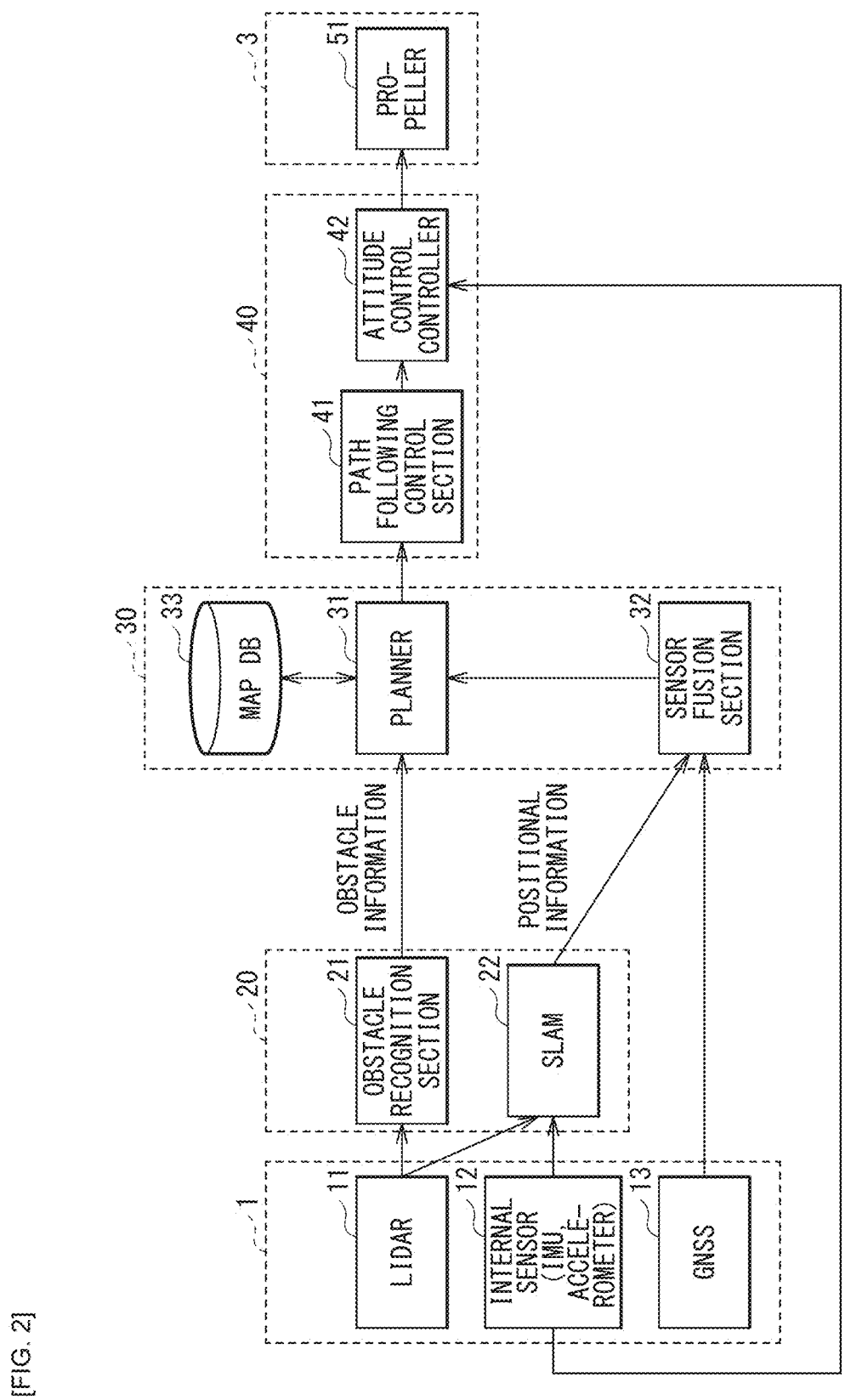

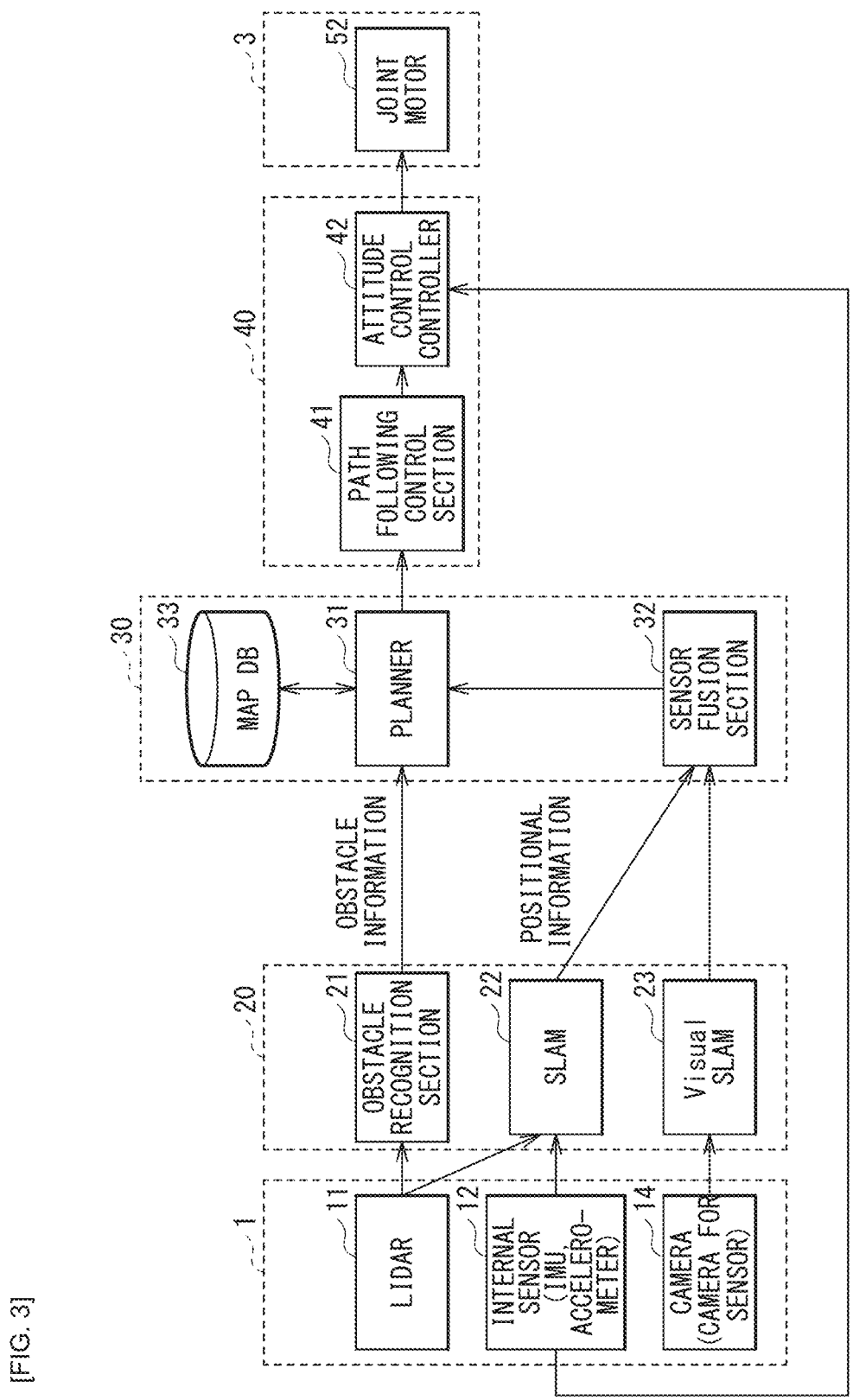
[FIG. 3]

[FIG. 4]
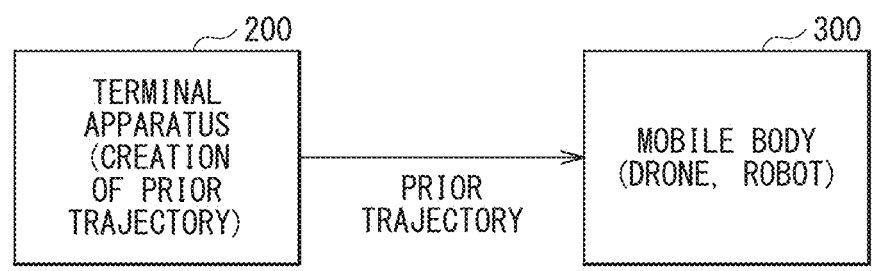

[FIG. 5]
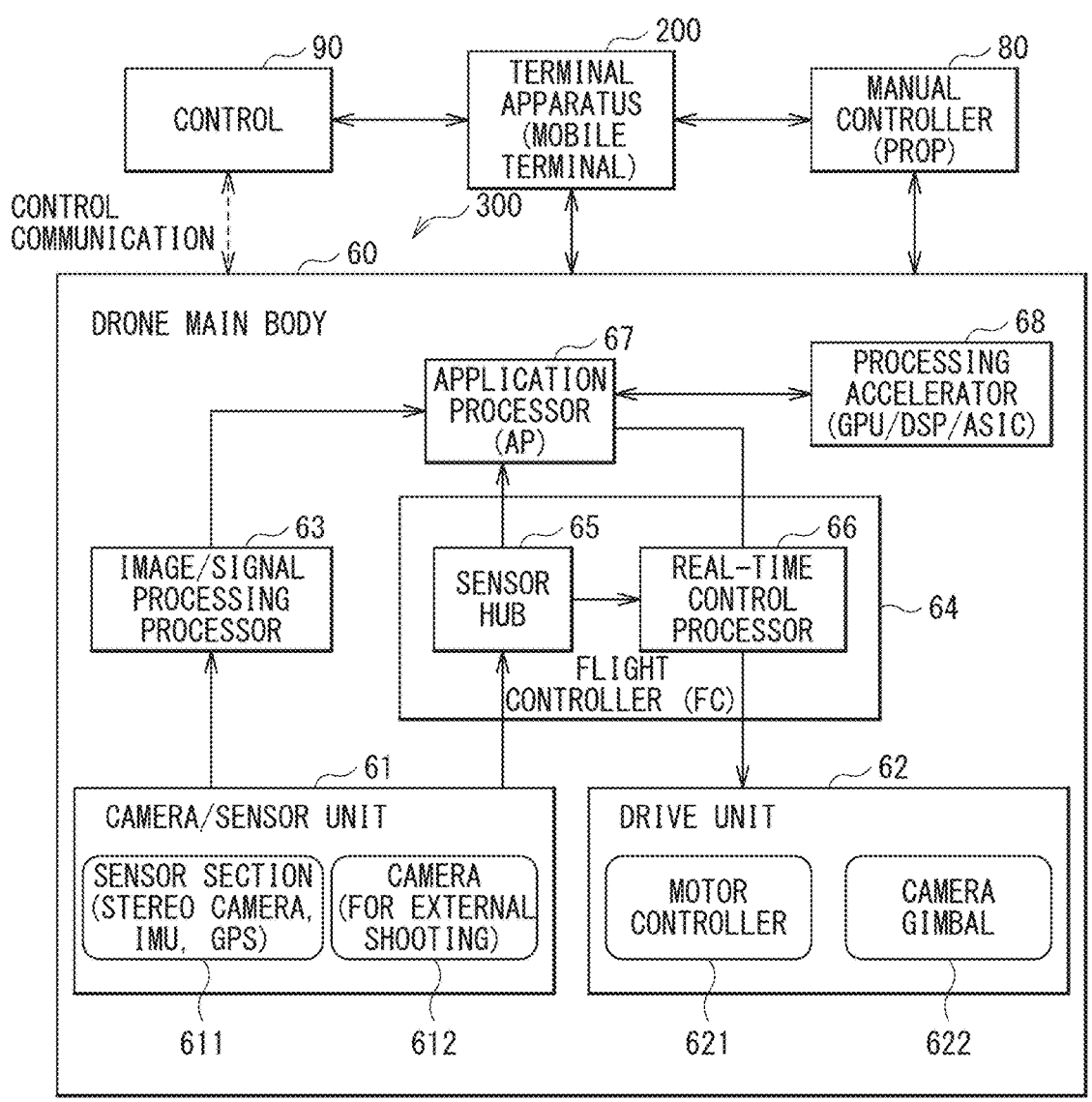

[FIG. 6]
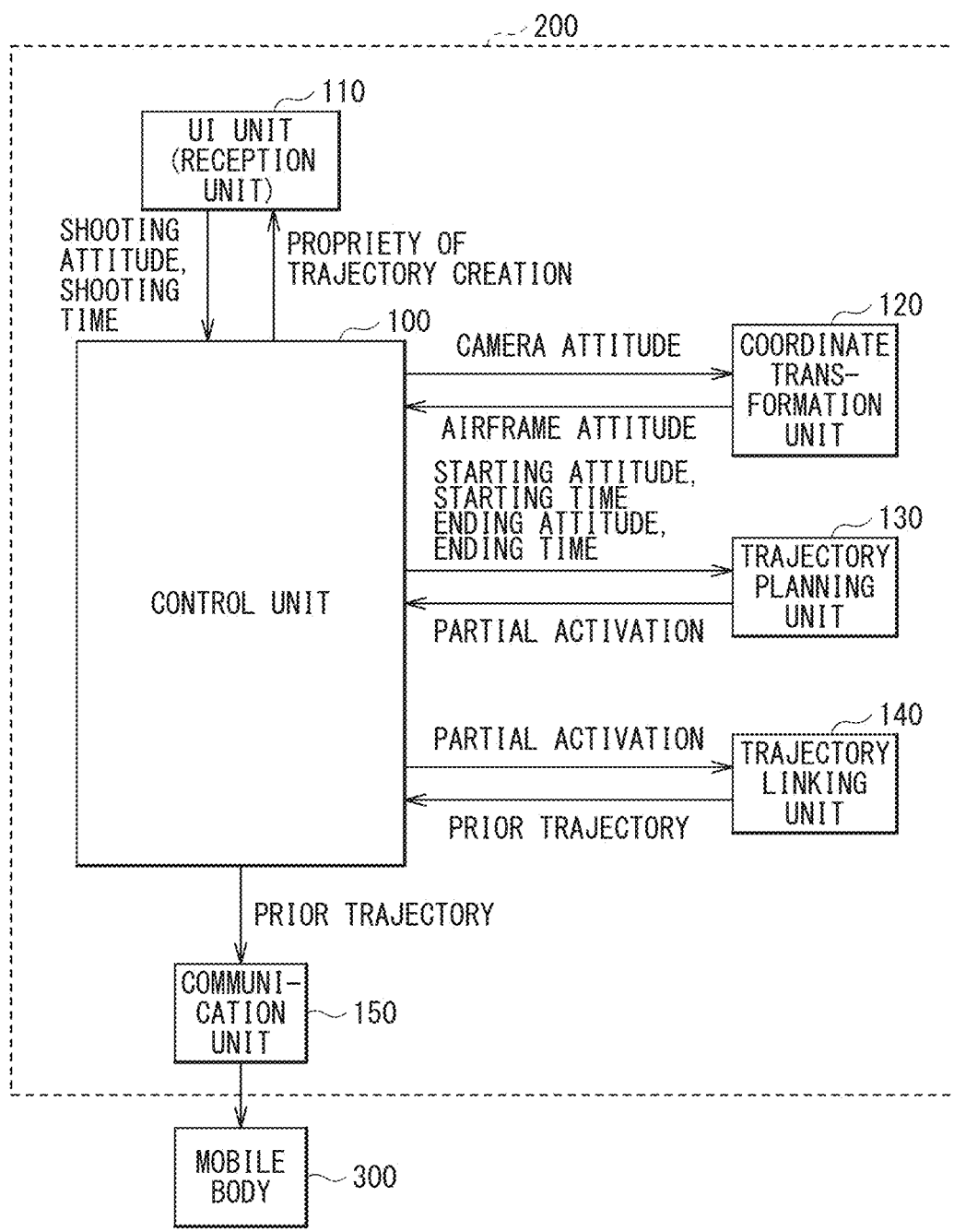

[FIG. 7]
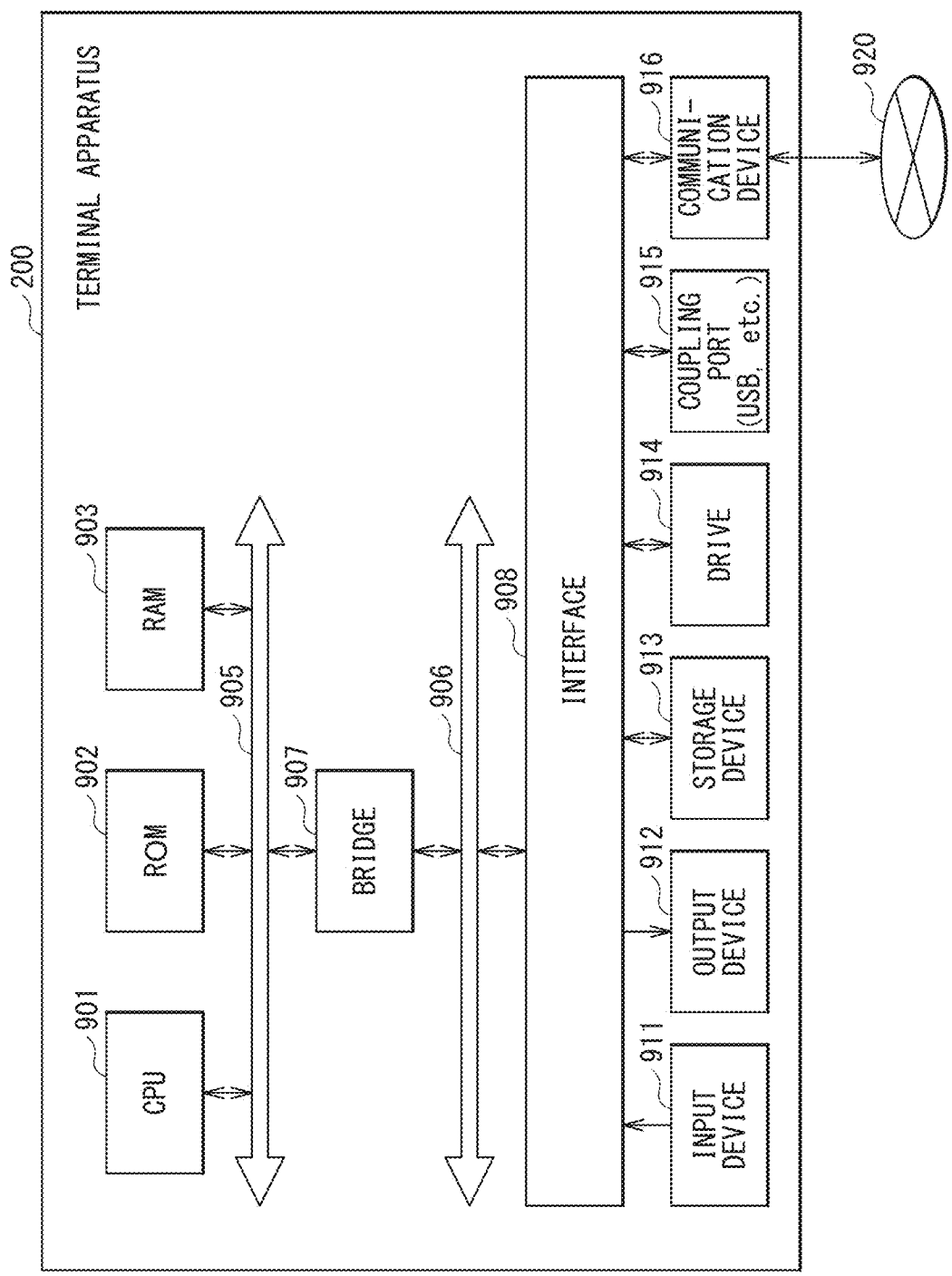

[FIG. 8]
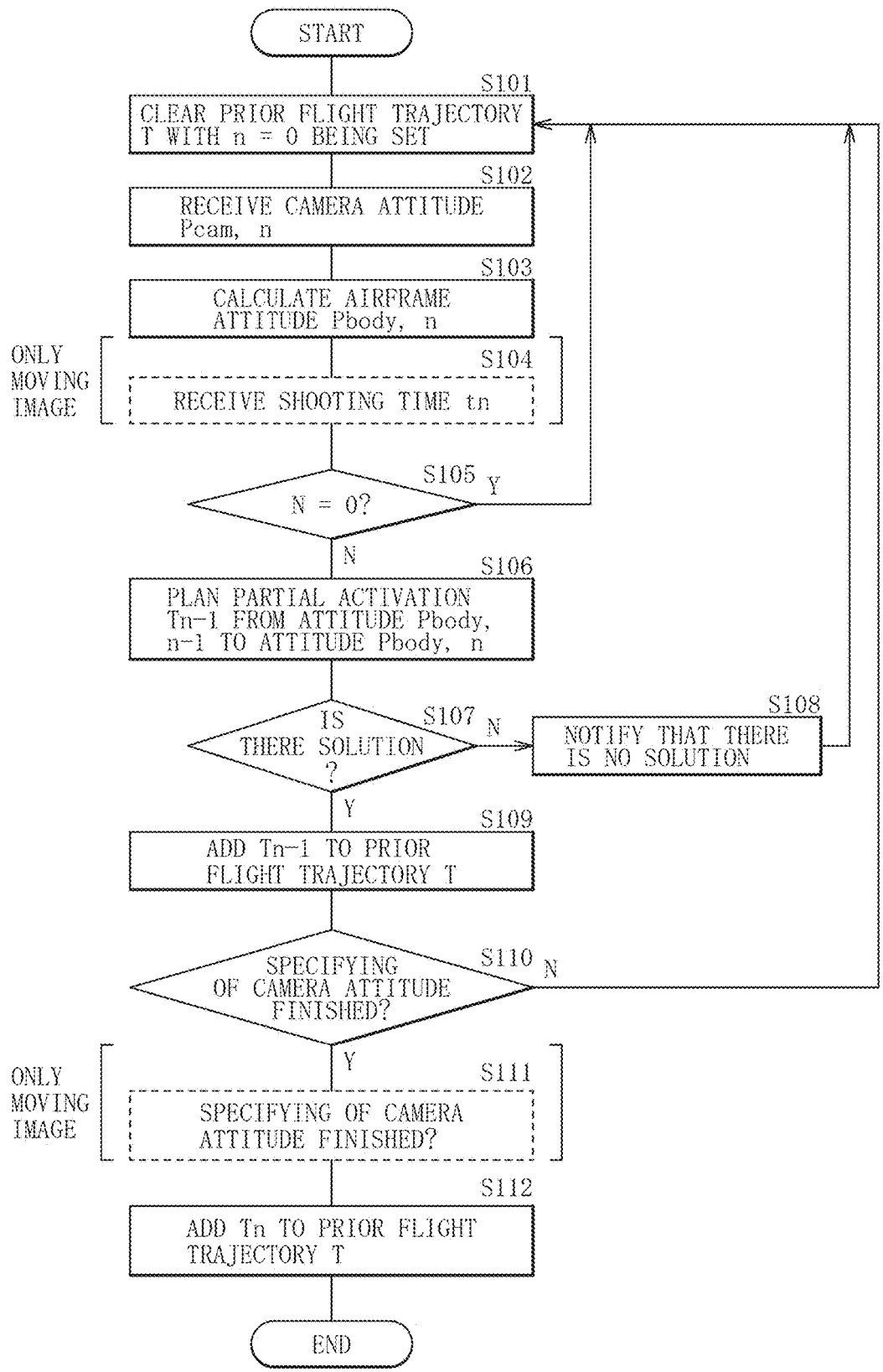

[FIG. 9]
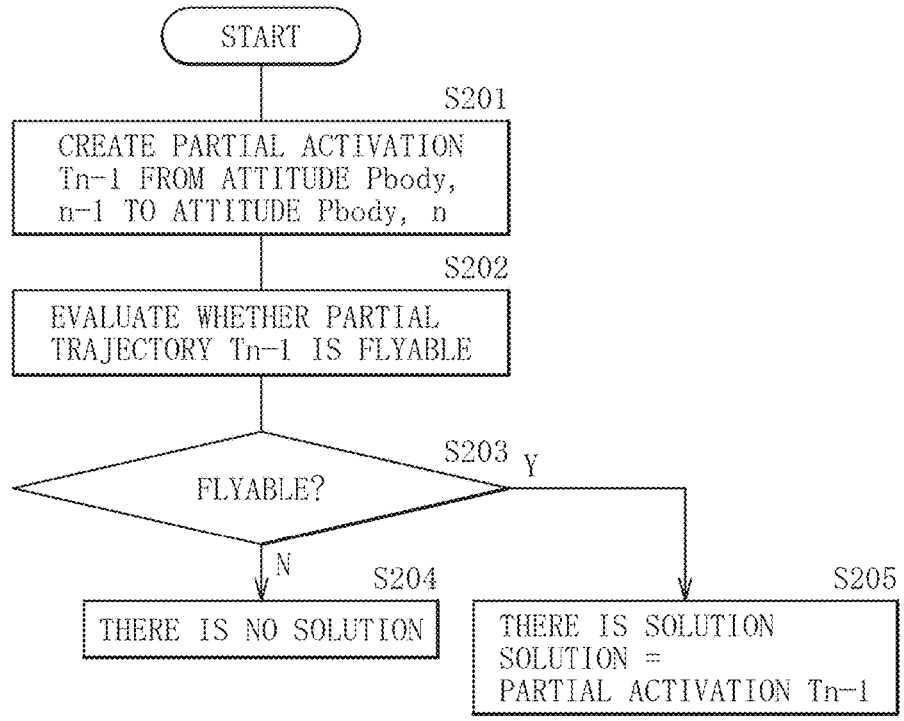
[FIG. 10]
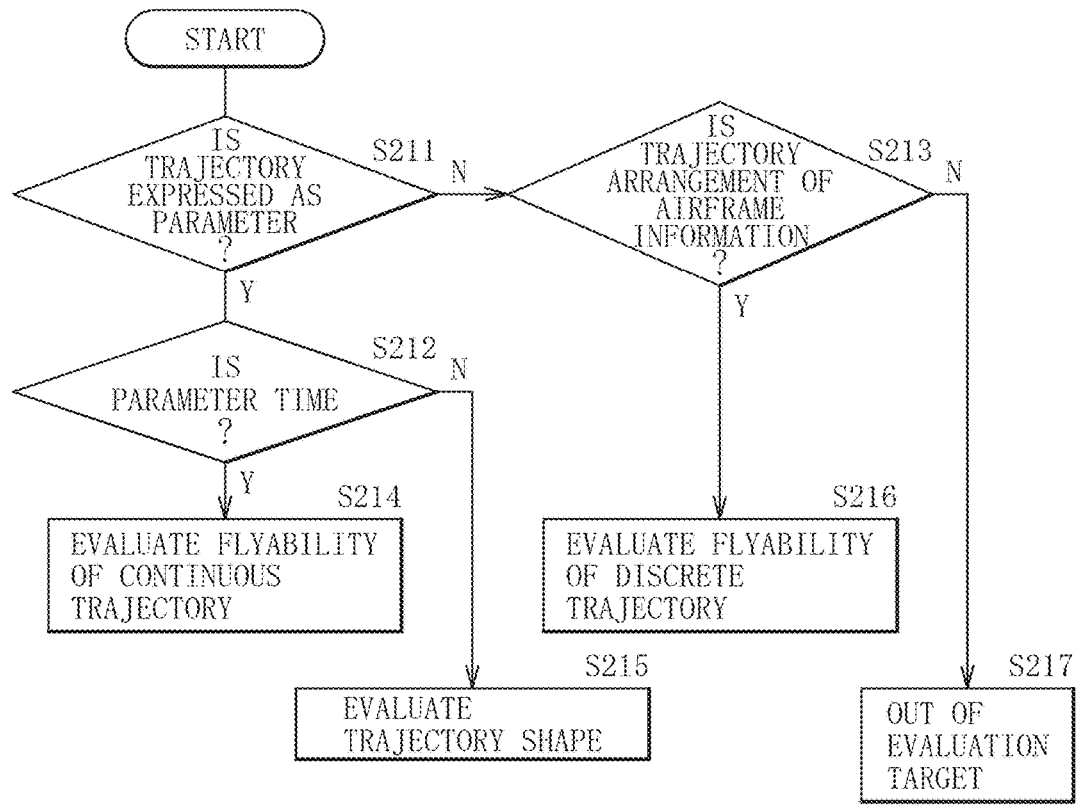

[FIG. 11]
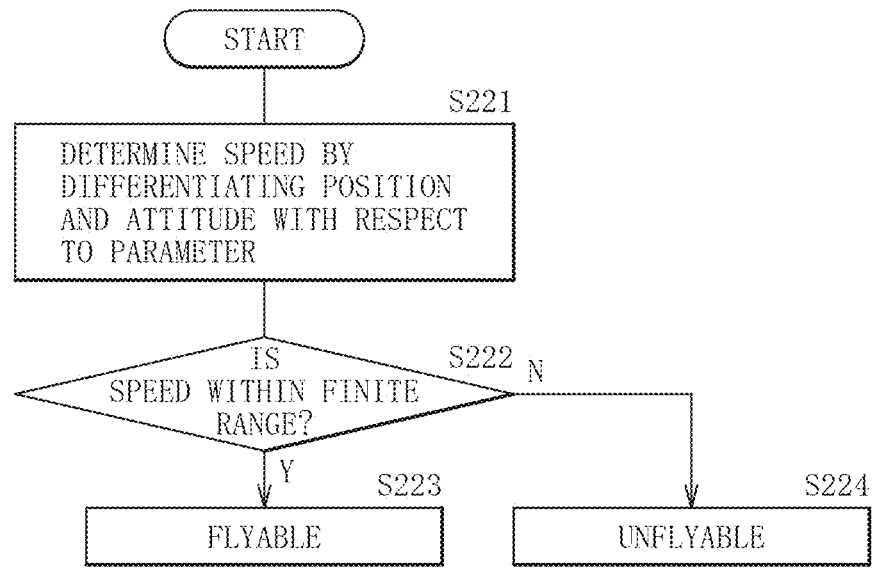

[FIG. 12]
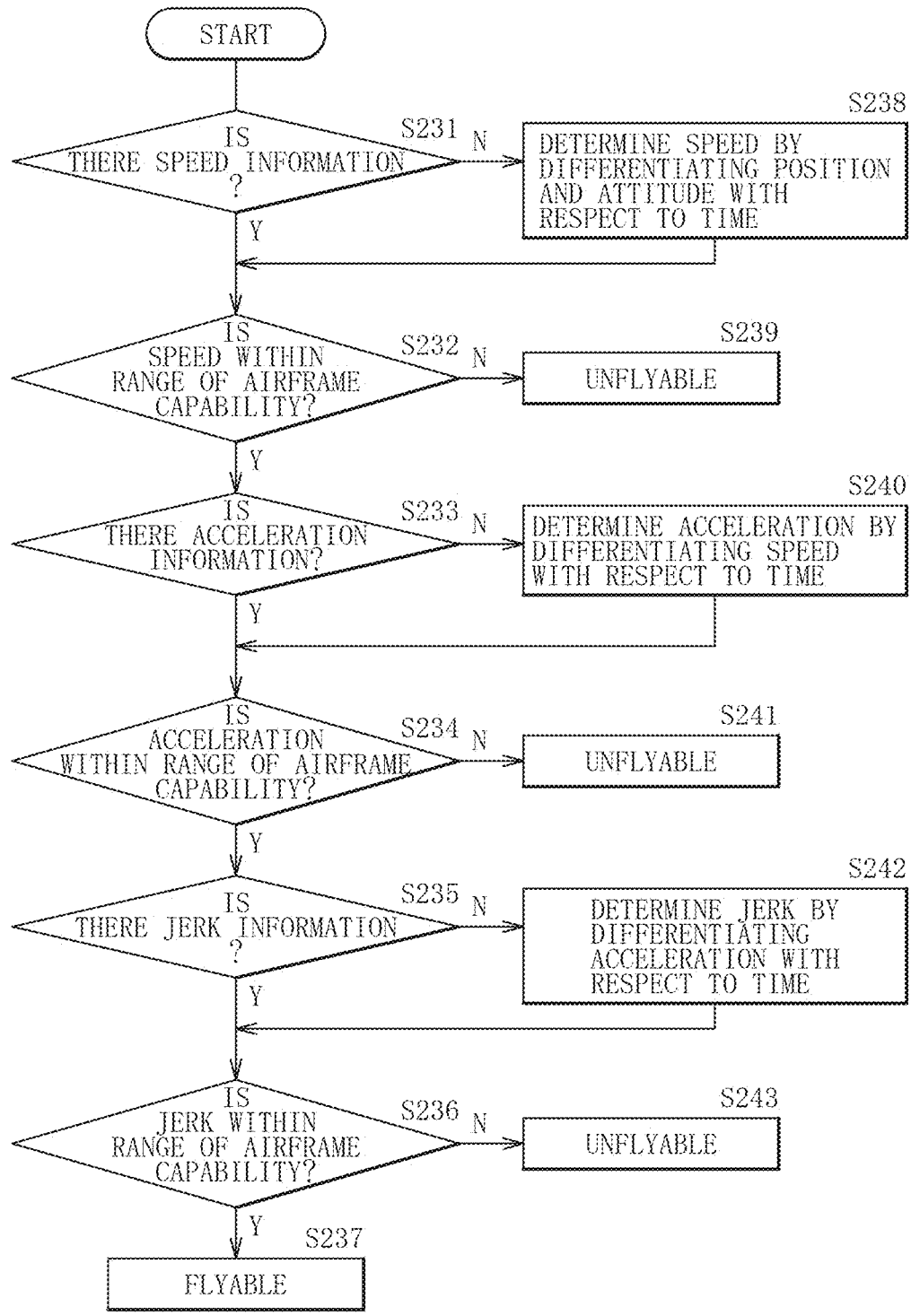

[FIG. 13]
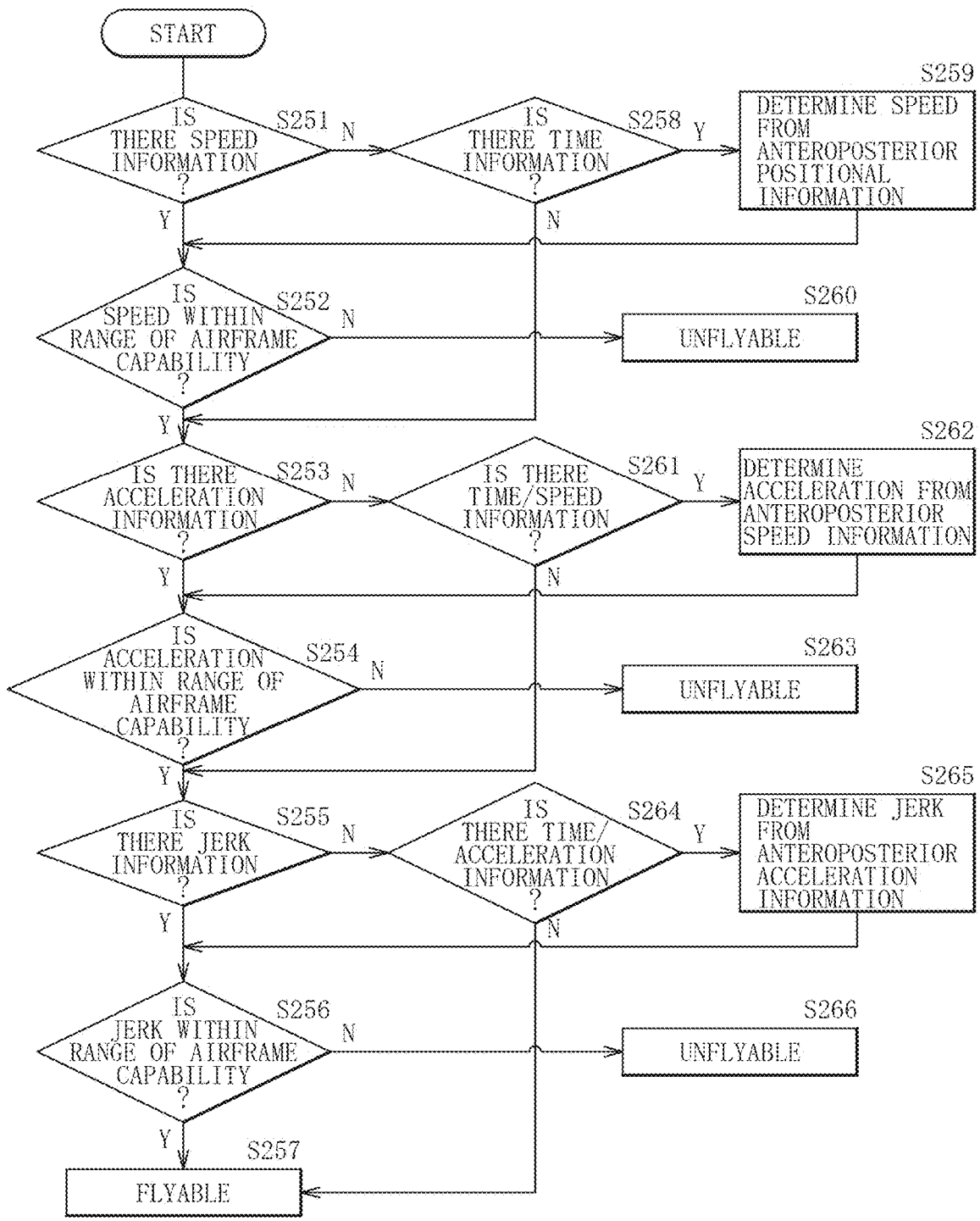

[FIG. 14]
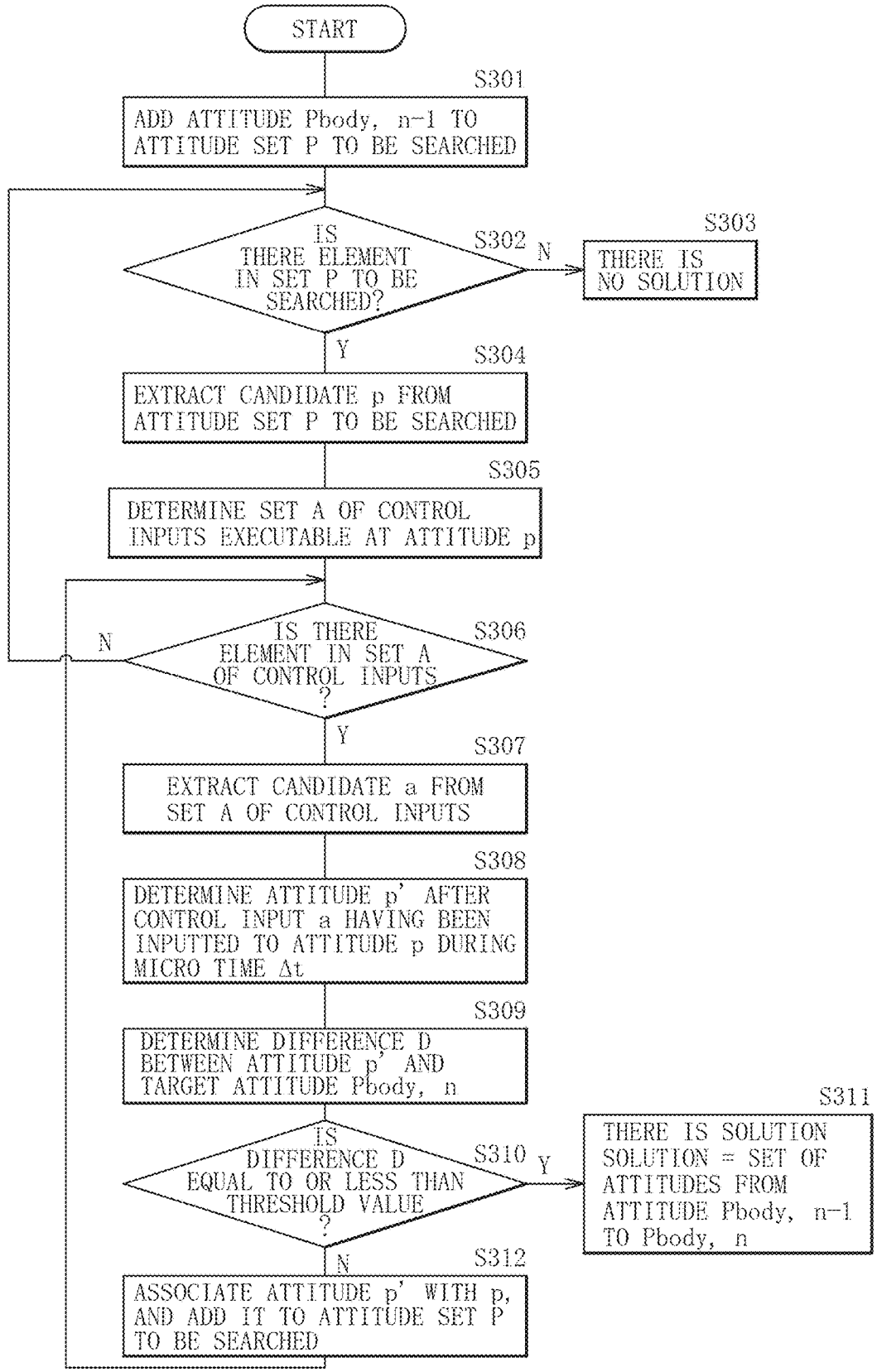

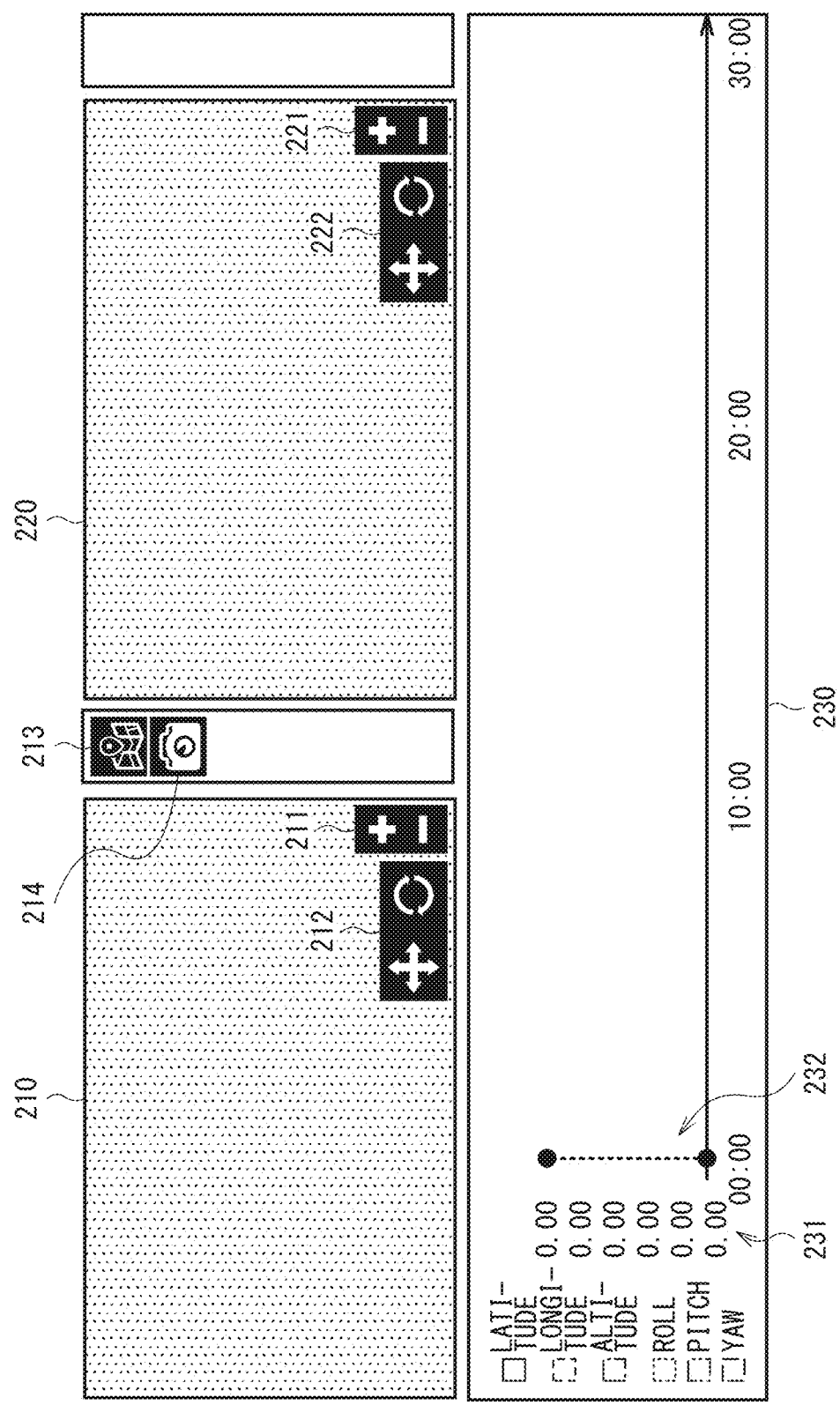

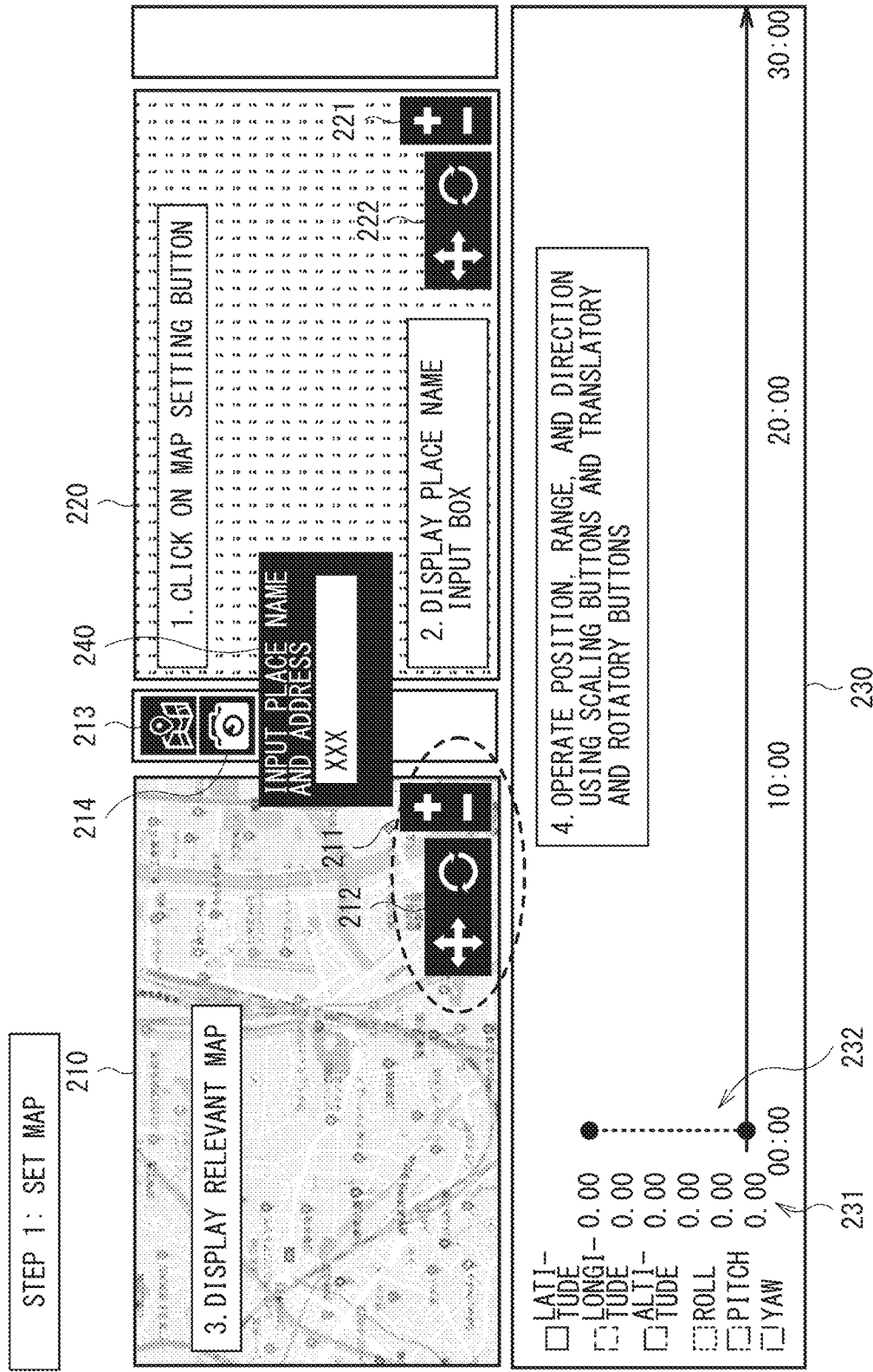

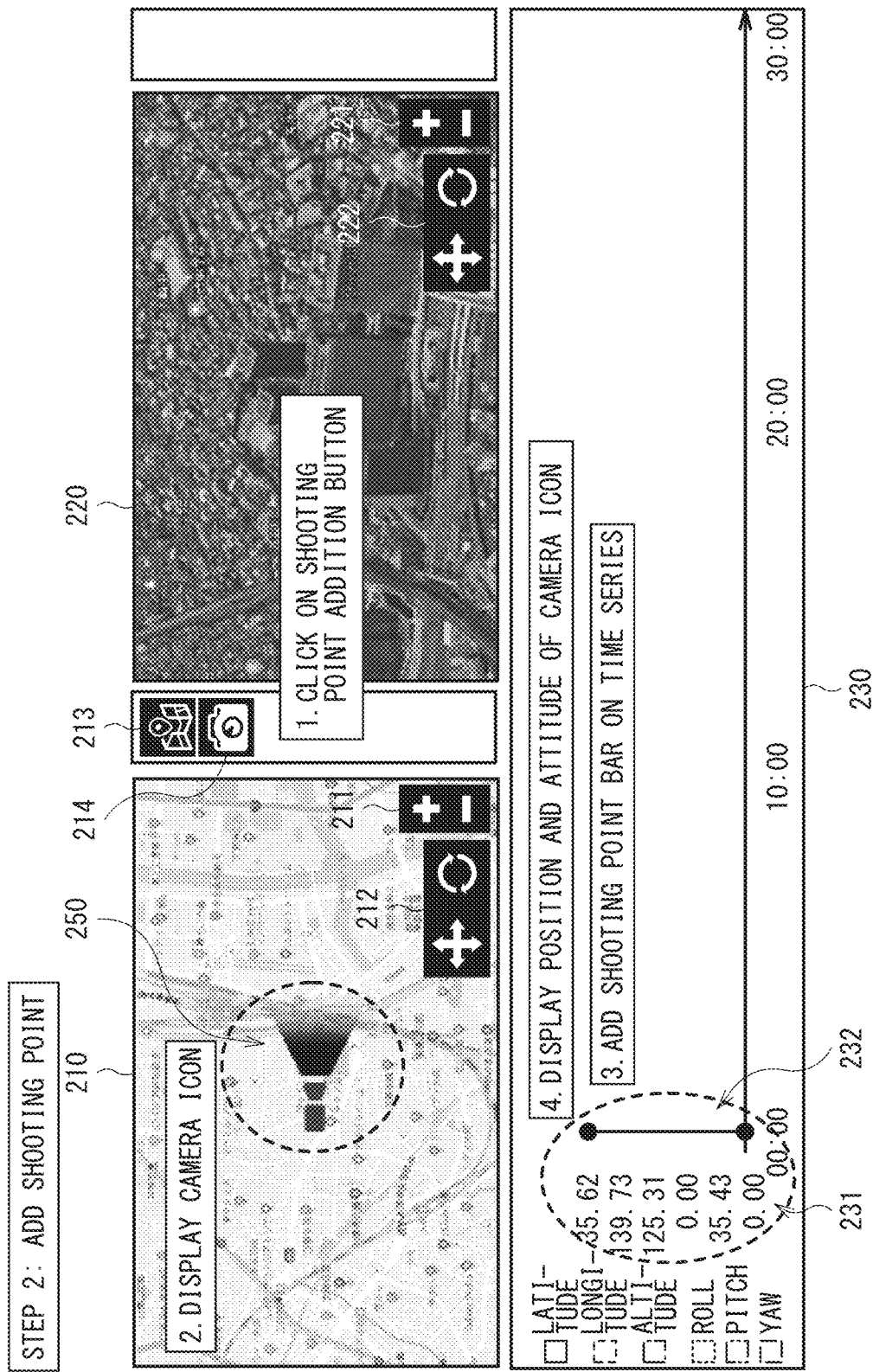

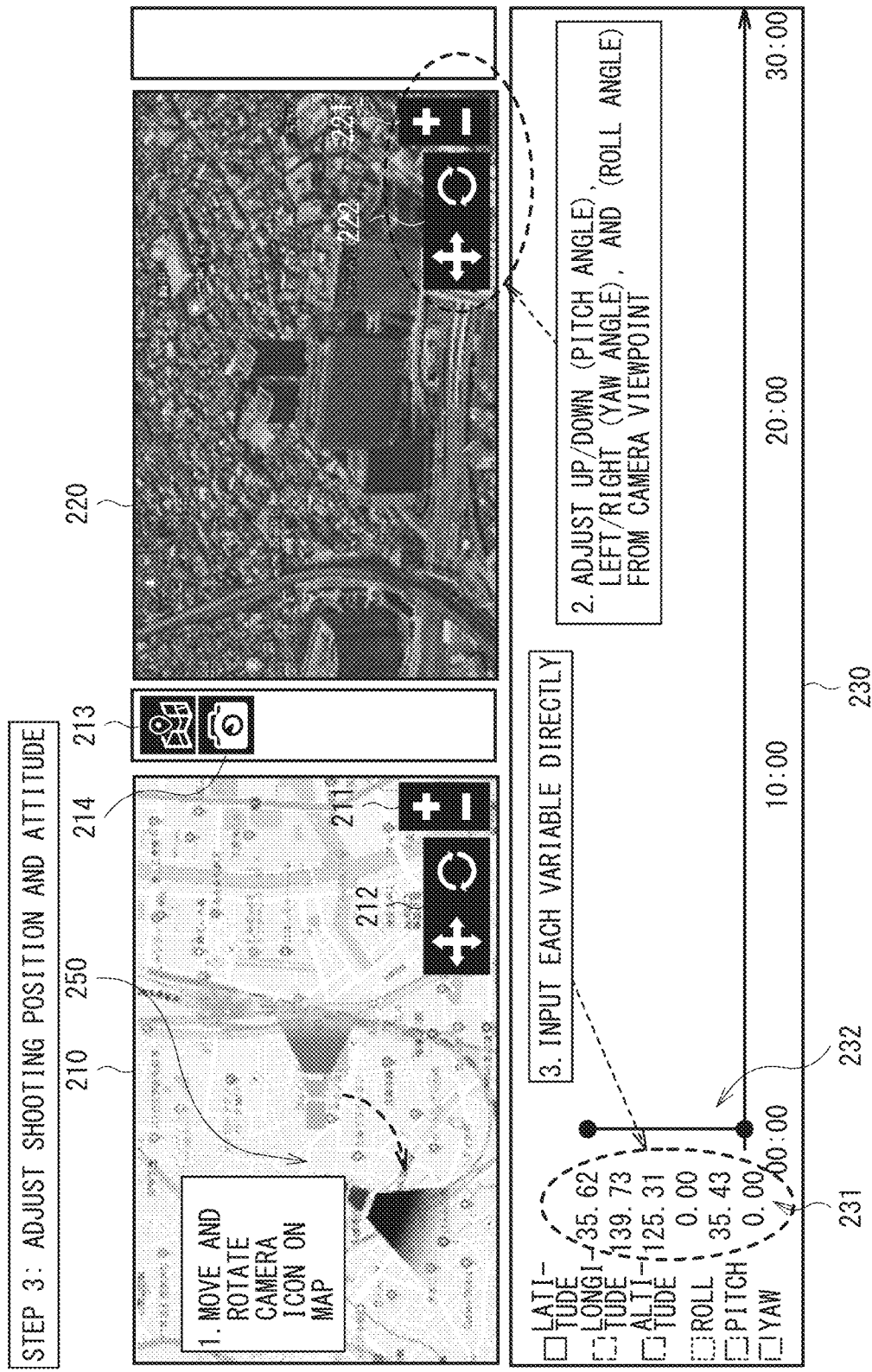

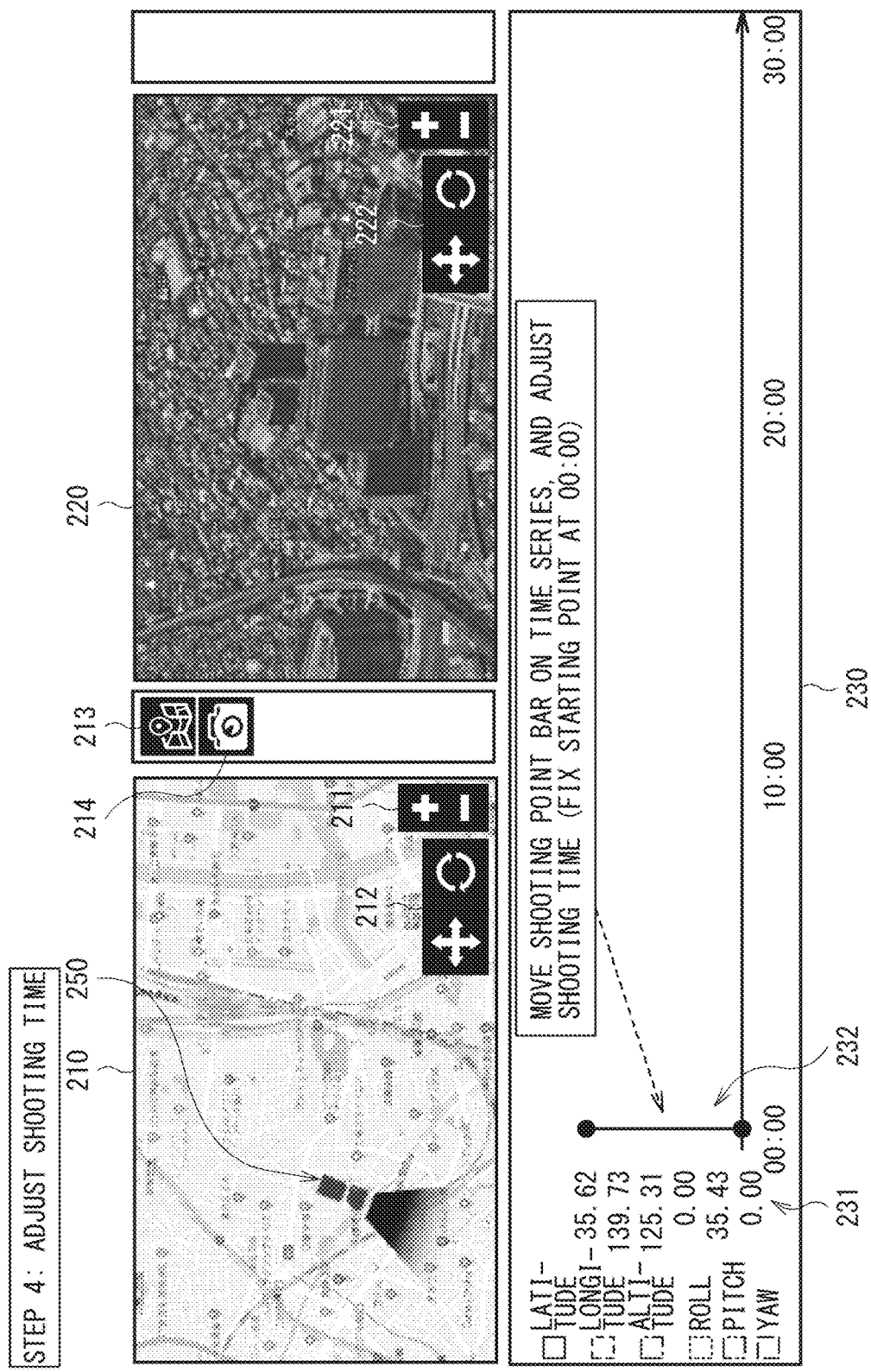

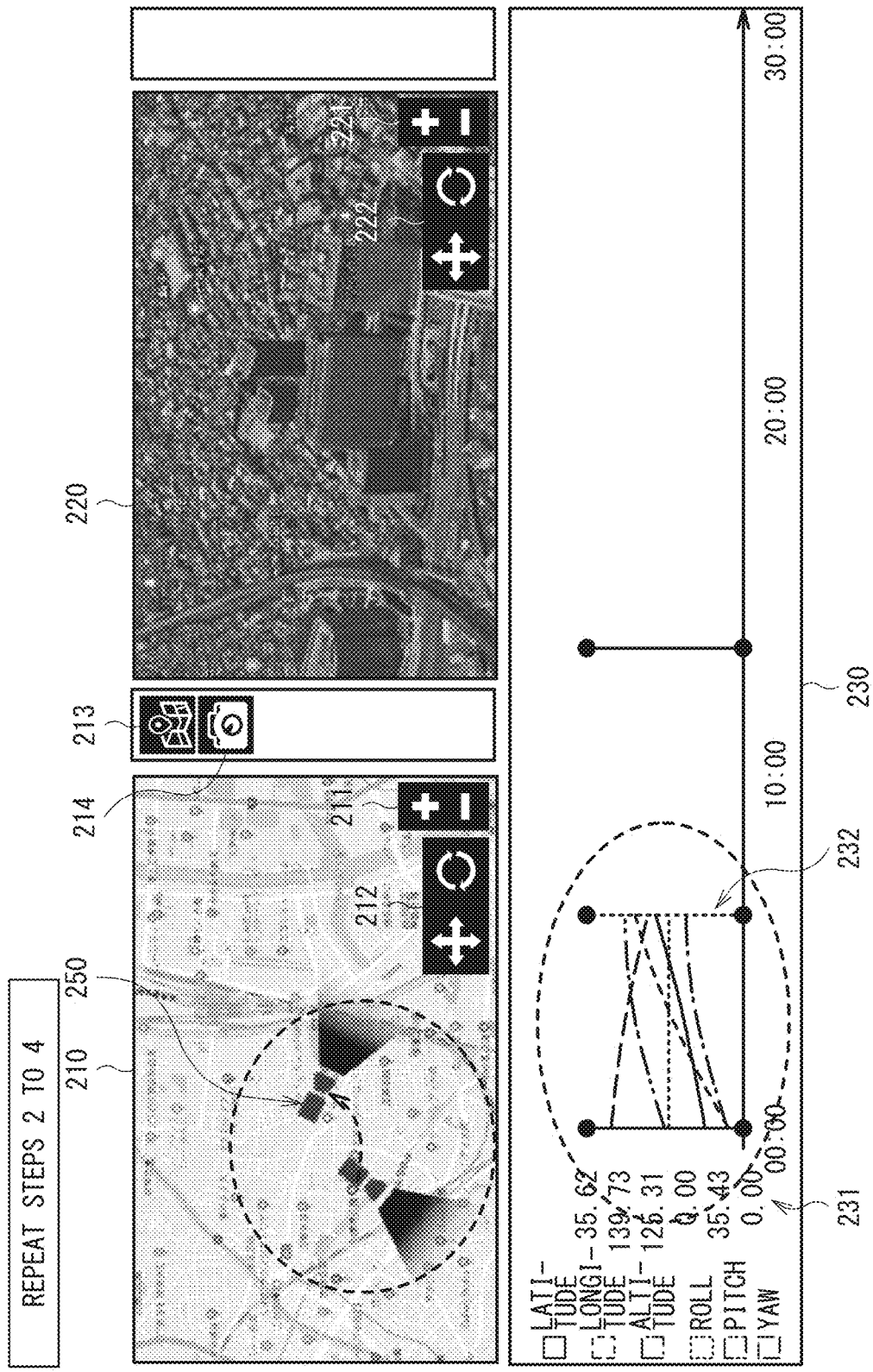

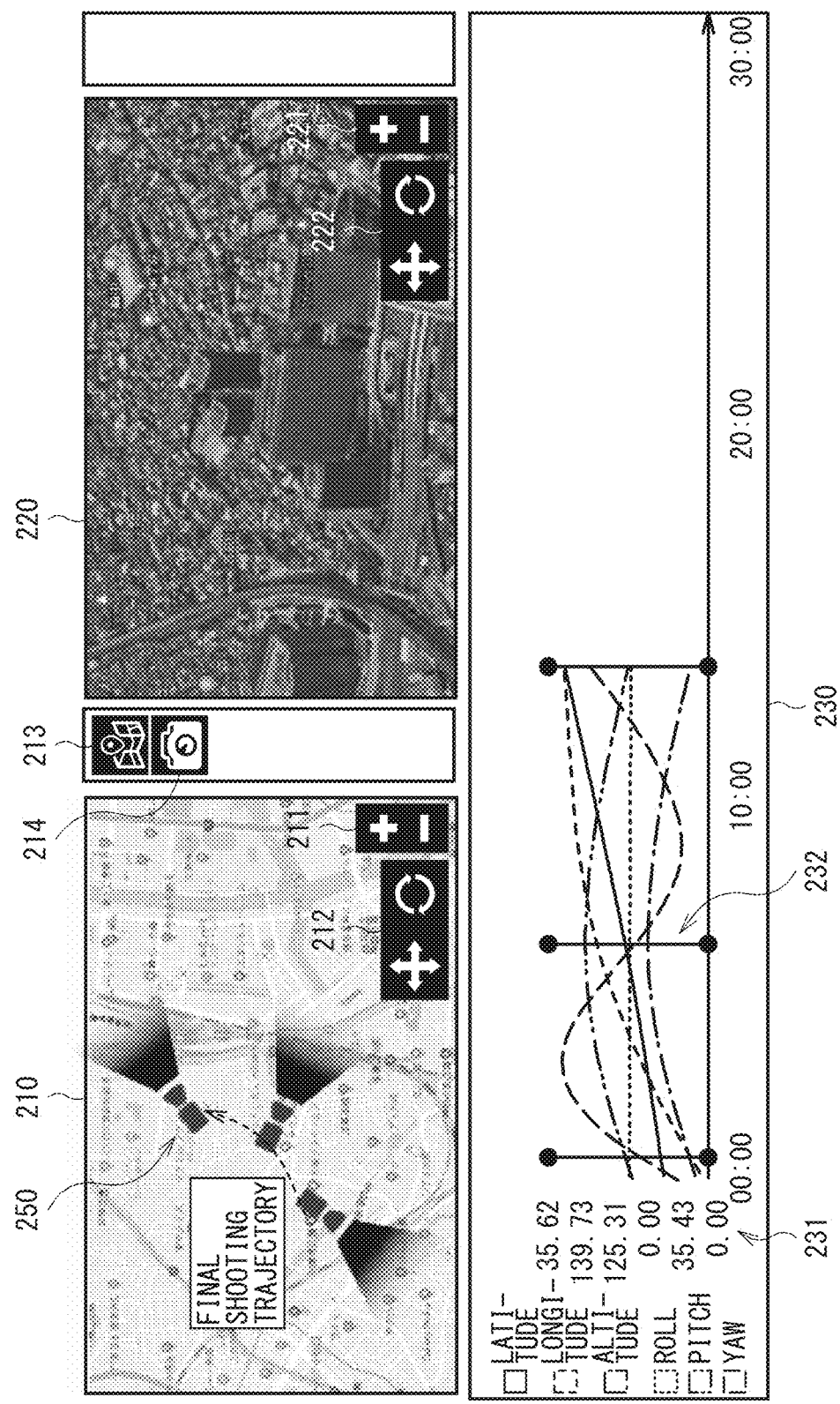
[FIG. 21]

INFORMATION PROCESSING METHOD AND INFORMATION PROCESSOR

CROSS REFERENCE TO RELATED APPLICATIONS

This application is a U.S. National Phase of International Patent Application No. PCT/JP2021/007151 filed on Feb. 25, 2021, which claims priority benefit of Japanese Patent Application No. JP 2020-039276 filed in the Japan Patent Office on Mar. 6, 2020. Each of the above-referenced applications is hereby incorporated herein by reference in its entirety.

Technical Field

The present disclosure relates to an information processing method, an information processor, and a program to perform processing related to trajectory planning of a mobile body.

BACKGROUND ART

Various techniques have been proposed to perform various types of processing related to a mobile body such as a robot or a drone (see PTLs 1 to 6 and NPTLs 1 to 4).

CITATION LIST

Patent Literature

PTL 1: Japanese Unexamined Patent Application Publication No. 2012-185752
PTL 2: Japanese Unexamined Patent Application Publication No. 2007-15037
PTL 3: Japanese Unexamined Patent Application Publication No. 2003-266347
PTL 4: Japanese Unexamined Patent Application Publication No. 2012-59176
PTL 5: Japanese Unexamined Patent Application Publication No. 2016-95841
PTL 6: Japanese Unexamined Patent Application Publication (Published Japanese Translation of PCT Application) No. JP2018-509676

Non-Patent Literature

NPTL 1: Y Tassa et al., "Control-limited differential dynamic programming", IEEE International Conference on Robotics and Automation (ICRA), 2014
NPTL 2: Using occupancy grids for mobile robot perception and navigation—IEEE Computer 2/25 1998.
NPTL 3: Rusu, Radu Bogdan, and Steve Cousins., "3d is here: Point cloud library (pcl).", Robotics and Automation (ICRA), 2011, IEEE International Conference on. IEEE, 2011.
NPTL 4: "A survey of motion planning and control techniques for self-driving urban vehicles", B. Paden et al, arxiv; 1604.07446v, 2016.

SUMMARY OF THE INVENTION

In a case of shooting while moving a mobile body provided with a camera, there is a request by a user to create a shooting trajectory of the camera and a moving trajectory of the mobile body in advance.

It is desirable to provide an information processing method, an information processor, and a program that make it possible to easily create trajectory planning of a mobile body.

An information processing method according to an embodiment of the present disclosure includes: performing processing to receive, on a predetermined coordinate system, input information including multiple scheduled points of shooting by a camera provided in a mobile body and information on respective camera attitudes at the multiple scheduled shooting points; and performing processing to create a prior trajectory of the mobile body on a basis of the received input information.

An information processor according to an embodiment of the present disclosure includes: a reception unit that receives, on a predetermined coordinate system, input information including multiple scheduled points of shooting by a camera provided in a mobile body and information on respective camera attitudes at the multiple scheduled shooting points; and a trajectory planning unit that creates a prior trajectory of the mobile body on a basis of the received input information.

A program according to an embodiment of the present disclosure causes a computer to execute processing which includes: performing processing to receive, on a predetermined coordinate system, input information including multiple scheduled points of shooting by a camera provided in a mobile body and information on respective camera attitudes at the multiple scheduled shooting points; and performing processing to create a prior trajectory of the mobile body on a basis of the received input information.

In the information processing method, the information processor, or the program according to an embodiment of present disclosure, input information including multiple scheduled points of shooting by a camera provided in a mobile body and information on respective camera attitudes at the multiple scheduled shooting points is received on a predetermined coordinate system. Processing is performed to create a prior trajectory of the mobile body on a basis of the received input information.

BRIEF DESCRIPTION OF THE DRAWINGS

FIG. 1 is a block diagram illustrating an overview of a mobile body to which an information processing method, an information processor, and a program according to a first embodiment of the present disclosure are applied.

FIG. 2 is a block diagram illustrating a first example of a detailed configuration of the mobile body.

FIG. 3 is a block diagram illustrating a second example of the detailed configuration of the mobile body.

FIG. 4 is a block diagram illustrating an overview of a mobile body system to which the information processing method according to the first embodiment is applied.

FIG. 5 is a block diagram schematically illustrating an example of a hardware configuration of a drone system as an example of the mobile body system.

FIG. 6 is a block diagram schematically illustrating a configuration example of a control system of a terminal apparatus according to the first embodiment.

FIG. 7 is a block diagram schematically illustrating an example of a hardware configuration of the terminal apparatus according to the first embodiment.

FIG. 8 is a flowchart schematically illustrating an example of a processing flow of creation of a prior trajectory by the terminal apparatus according to the first embodiment.

FIG. 9 is a flowchart schematically illustrating an example of an operational flow of a first example of planning of a partial trajectory between attitudes.

FIG. 10 is a flowchart schematically illustrating an example of a flow of a method of evaluation as to whether the partial trajectory is flyable.

FIG. 11 is a flowchart schematically illustrating an example of a flow of processing of evaluation of a trajectory shape.

FIG. 12 is a flowchart schematically illustrating an example of a flow of evaluation as to whether a continuous trajectory is flyable.

FIG. 13 is a flowchart schematically illustrating an example of a flow of evaluation as to whether a discrete trajectory is flyable.

FIG. 14 is a flowchart schematically illustrating an example of an operational flow of a second example of the planning of the partial trajectory between attitudes.

FIG. 15 is an explanatory diagram schematically illustrating an example of an initial screen of a GUI screen for the creation of the prior trajectory by the terminal apparatus according to the first embodiment.

FIG. 16 is an explanatory diagram schematically illustrating a screen example in a stage (step 1) of setting a map using the GUI screen illustrated in FIG. 15.

FIG. 17 is an explanatory diagram schematically illustrating a screen example in a stage (step 2) of additional setting of a shooting point using the GUI screen illustrated in FIG. 15.

FIG. 18 is an explanatory diagram schematically illustrating a screen example in a stage (step 3) of setting a shooting position and a shooting attitude using the GUI screen illustrated in FIG. 15.

FIG. 19 is an explanatory diagram schematically illustrating a screen example in a stage (step 4) of setting adjustment of shooting time using the GUI screen illustrated in FIG. 15.

FIG. 20 is an explanatory diagram schematically illustrating a screen example in a stage where the settings of steps 2 to 4 are repeated using the GUI screen illustrated in FIG. 15.

FIG. 21 is an explanatory diagram schematically illustrating an example of a prior trajectory created using the GUI screen illustrated in FIG. 15.

MODES FOR CARRYING OUT THE INVENTION

Hereinafter, description is given in detail of embodiments of the present disclosure with reference to the drawings. It is to be noted that the description is given in the following order.

1. First Embodiment 1.0 Overview and Issue of Mobile Body (FIGS. 1 to 4)
1.1 Configuration (FIGS. 5 to 7)
1.2 Operation (FIGS. 8 to 14)
1.3 Specific Example of Creation of Prior Trajectory (FIGS. 15 to 21)
1.4 Effects
2. Other Embodiments 1. First Embodiment 1.0 Overview and Issue of Mobile Body (Overview of Mobile Body)

Technologies of an information processing method, an information processor, and a program according to a first embodiment are applicable to processing for a mobile body. For example, the technologies are applicable to processing for a mobile body that includes a sensing device (sensor) and an electronic computer and that operates autonomously or in accordance with an instruction while processing data. The technologies are applicable to, for example, a drone, a robot, an automated cart, a self-driving car, and the like, as the mobile body.

FIG. 1 illustrates an overview of a mobile body to which the information processing method, the information processor, and the program according to the first embodiment of the present disclosure are applied. FIG. 2 illustrates a first example of a detailed configuration of the mobile body. FIG. 2 illustrates a detailed configuration example of a drone, for example, as the mobile body. FIG. 3 illustrates a second example of the detailed configuration of the mobile body. FIG. 3 illustrates a detailed configuration example of a multi-legged walking robot, for example, as the mobile body.

As illustrated in FIG. 1, the mobile body includes, for example, a sensor unit 1, a processor 2, a drive mechanism unit 3, and a camera 4 for external shooting. The processor 2 includes a recognition unit 20, an action planning unit 30, and an action control unit 40. The mobile body may include multiple processors 2.

The sensor unit 1 includes, for example, an internal sensor such as a gyro sensor or a geomagnetic sensor, a camera, and an external sensor such as a ToF (Time of Flight) sensor, and outputs sensor information from these sensors. The sensor unit 1 includes, for example, at least one of a camera, an acceleration sensor, a laser rangefinder, a ToF (Time of Flight) sensor, a geomagnetic sensor, a gyro sensor, a contact sensor, a temperature sensor, a humidity sensor, GNSS (Global Navigation Satellite Systems), or the like.

In a case where the mobile body is a drone, for example, the sensor unit 1 includes LIDAR (Laser Imaging Detection and Ranging) 11, an internal sensor 12, and GNSS (Global Navigation Satellite Systems, global navigation satellite system) 13, as illustrated in FIG. 2. The internal sensor 12 includes, for example, IMU (Inertial Measurement Unit, inertial measurement unit) and an acceleration sensor. The IMU detects an angle (or an angular speed) and acceleration. The internal sensor 12 outputs, for example, sensor information on a position, an attitude, a speed, acceleration, angular acceleration, and the like.

In a case where the mobile body is a multi-legged walking robot, for example, the sensor unit 1 includes the LIDAR 11, the internal sensor 12, and a camera 14, as illustrated in FIG. 3. The camera 14 is a camera for a sensor that differs from the camera 4 for external shooting.

The recognition unit 20 performs recognition processing on the basis of the sensor information from the sensor unit 1. The recognition unit 20 outputs various types of image data as recognition results. In addition, the recognition unit 20 outputs, as the recognition results, data such as the expression, position, and attribute of people in the vicinity as well as data such as the position of itself or an obstacle. In addition, the recognition unit 20 outputs, as the recognition results, data such as the type, position, and attribute of an object in the vicinity. Examples of the recognition processing by the recognition unit 20 include generation of position data, attitude data, and the like of a robot or a target object from a template image and a captured image in a line-of-sight direction by using a camera provided in the robot in the technique described in PTL 1.

In a case where the mobile body is a drone, for example, the recognition unit 20 includes an obstacle recognition section 21 and SLAM (Simultaneously Localization and Mapping) 22, as illustrated in FIG. 2. The obstacle recognition section 21 outputs obstacle information such as a position of an obstacle in the vicinity, for example, on the basis of the sensor information. The SLAM 22 estimates a position of itself, for example, on the basis of the sensor information, and outputs information on the position of itself.

In a case where the mobile body is a multi-legged walking robot, for example, the recognition unit 20 includes the obstacle recognition section 21, the SLAM 22, and Visual SLAM 23, as illustrated in FIG. 3. The Visual SLAM 23 outputs information such as ID (Identification) of the nearest landmark, a relative position from the landmark, and an attitude.

The action planning unit 30 plans an action of the entire airframe or a portion of the airframe, and outputs action planning information. Examples of the action planning information include the movement trajectory, status change, speed, acceleration, and the like of the entire aircraft or a component.

The action planning unit 30 includes, for example, a planner 31, a sensor fusion section 32, and a map DB (database) 33, as illustrated in FIGS. 2 and 3. The planner 31 plans the movement trajectory, for example. The planner 31 may refer to map data of the map DB 33 for the planning of the movement trajectory. The movement trajectory includes, for example, point series data of positional information (x, y, z) for every 0.1 second, and series data such as a target speed and a target angular speed for each time point. In a case where the mobile body is a drone, for example, the sensor fusion section 32 outputs self-position information or the like with improved accuracy, on the basis of information from the GNSS 13 and information from the SLAM 22, as illustrated in FIG. 2. In addition, in a case where the mobile body is a multi-legged walking robot, for example, the sensor fusion section 32 outputs the self-position information, self-attitude information, or the like with improved accuracy, on the basis of the information from the Visual SLAM 23 and the information from the SLAM 22, as illustrated in FIG. 3.

The action planning unit 30 plans a trajectory of a rough position of an airframe, e.g., a position such as a gravity center position of the airframe or a fingertip position, and outputs it as the action planning information. For example, NPTL 1 describes a technique for planning a car automated parking trajectory by means of an algorithm of BOX-DDP, and outputs it as the action planning information. In addition, NPTL 4 describes multiple movement trajectory generation techniques such as A* (star) and RRT (Rapidly exploring Random Tree). According to NPTL 4, it is possible to express the movement trajectory by a sequence of points at equal distance intervals or a sequence of points at equal time intervals. In addition, it is also possible to impart a speed, acceleration, and an angular speed at each of the points. It is also possible to utilize information on an obstacle in the vicinity or geographical information (map data) upon planning of an action.

NPTL 2 describes a technique for searching for a path for a robot on the basis of an obstacle map of a grid-shaped data structure, which is an Occupancy grid map (environment grid map). In addition, NPTL 3 describes a technique related to an obstacle map of a data structure of a point set, which is a point cloud (point cloud) based on a 3D scanning sensor such as a ToF sensor or LIDAR.

The action control unit 40 outputs a control signal to control the drive mechanism unit 3 on the basis of the action planning information from the action planning unit 30. In a case where the mobile body is a robot, for example, the action control unit 40 outputs a control signal to an actuator positioned at each of parts of the robot, to allow a status of the robot to comply with a predefined condition (e.g., not falling down, etc.). For example, in the technique described in NPTL 1, each joint is controlled on the basis of a low-level PD controller housed in each joint, and walking motions of the robot are achieved.

The action control unit 40 includes, for example, a path following control section 41 and an attitude control controller 42, as illustrated in FIGS. 2 and 3.

The drive mechanism unit 3 includes various drive mechanisms for achieving movements of the mobile body, e.g., an actuator, a motor, a servo motor, a brake, and the like. The drive mechanism unit 3 may include components to output various types of information to the outside of the mobile body. For example, an LED (Light Emitting Diode), a display device, a speaker, or the like may be included.

In a case where the mobile body is a drone, for example, the drive mechanism unit 3 may include multiple propellers 51, as illustrated in FIG. 2. In this case, the attitude control controller 42 may output a control signal to control respective rotational speeds of the multiple propellers 51, for example.

In addition, in a case where the mobile body is a multi-legged walking robot, for example, the drive mechanism unit 3 may include a joint motor 52, as illustrated in FIG. 3. In this case, the attitude control controller 42 may output a control signal to drive and control the joint motor 52, for example.

(Issue)

In a case of shooting by using the camera 4 for external shooting while moving the mobile body as illustrated in FIGS. 1 to 3, there is a request by a user to create a shooting trajectory of the camera 4 and a moving trajectory of the mobile body in advance.

In this case, in existing techniques, it is difficult for the user to create, in advance, a smooth shooting trajectory that passes through multiple shooting points and a smooth moving trajectory that is actually feasible for the mobile body. Reasons for this are as follows. The first issue is that there are many control variables of the mobile body and control variables of the camera, making it difficult to manually create all of these. In addition, the second issue is that the smoothness of the moving trajectory and the smoothness of the shooting trajectory are not necessarily coincident with each other. In addition, the third issue is that the user needs to know airframe characteristics in advance in order to create a trajectory that is actually feasible for the mobile body.

Examples of the method of creating a trajectory of the mobile body in advance include a method of specifying multiple two-dimensional positions on a screen and rewriting the height from a default value. In this method, it is difficult to create a smooth moving trajectory, and it is difficult to express an attitude (direction). In addition, it is difficult to specify a trajectory of the mobile body in consideration of shooting.

In addition, although there is a method of expressing a fixed trajectory by a relative position, it is difficult to edit it.

In addition, although there is a method of creating a moving trajectory as if drawing a line on a map using a Bezier curve, the moving trajectory may possibly result in being a line which is unpassable for the mobile body, depending on a speed or an attitude.

Therefore, it is desired to develop a technique that makes it possible to easily create trajectory planning of the mobile body.

In order to solve the above-described issue, in the technology according to the first embodiment, processing is performed to receive, on a predetermined coordinate system, input information including shooting points (scheduled shooting points) and information on respective camera attitudes at the shooting points, instead of an attitude of the mobile body. In addition, processing is performed to determine multiple attitudes of the mobile body on the basis of the multiple camera attitudes at the multiple shooting points and to determine a partial trajectory that smoothly links the multiple attitudes together. In addition, processing is performed to evaluate whether or not the partial trajectory created by the processing to create a partial trajectory is actually passable by the mobile body, and processing is performed to create the partial trajectory again in a case where the partial trajectory is evaluated to be actually unpassable.

Hereinafter, description is given of a first embodiment of each of the information processing method, the information processor, and the program, which perform and implement these pieces of processing.

1.1 Configuration (System Configuration)

FIG. 4 is a block diagram illustrating an overview of a mobile body system to which the information processing method according to the first embodiment is applied.

The information processing method according to the first embodiment is applied to a systems including a terminal apparatus 200 and a mobile body 300.

The terminal apparatus 200 receives, on a predetermined coordinate system, input information such as information on shooting points from the user, and performs processing to edit and create a prior trajectory of the information mobile body 300 on the basis of the input information. The terminal apparatus 200 may be, for example, a personal computer, a mobile terminal, or the like.

The terminal apparatus 200 corresponds to a specific example of an "information processor" in the technology of the present disclosure. The information processing method in the technology of the present disclosure is implemented by the terminal apparatus 200.

The mobile body 300 is, for example, a drone or a robot as illustrated in FIGS. 1 to 3. The mobile body 300 moves in accordance with the prior trajectory created by the terminal apparatus 200.

FIG. 5 schematically illustrates an example of a hardware configuration of a drone system as an example of the mobile body system. FIG. 5 illustrates a system configuration example in a case where the mobile body 300 is a drone. The drone may be a drone having the configuration as illustrated in FIG. 2.

The drone system includes, for example, a control 90, a manual controller 80, the terminal apparatus 200, and the mobile body 300. It is to be noted that, although an example is given here in which the manual controller 80 and the terminal apparatus 200 are configured separately, the manual controller 80 and the terminal apparatus 200 may be configured as a single apparatus.

The control 90 is able to communicate with the terminal apparatus 200 and the mobile body 300 wirelessly, etc. The terminal apparatus 200 is able to communicate with the mobile body 300 and the manual controller 80 by wire or wirelessly. The manual controller 80 is able to communicate with the mobile body 300 wirelessly.

The mobile body 300 includes, for example, a drone main body 60. The drone main body 60 includes a camera/sensor unit 61, a drive unit 62, an image/signal processing processor 63, an FC (flight controller) 64, an AP (application processor) 67, and a processing accelerator 68.

The flight controller 64 includes, for example, a sensor hub 65 and a real-time control processor 66.

The processing accelerator 68 includes, for example, GPU (Graphics Processing Unit), DSP (Digital Signal Processor), ASIC (Application Specific Integrated Circuit), and the like.

The camera/sensor unit 61 includes, for example, a sensor section 611 and a camera 612. The sensor section 611 includes, for example, a stereo camera, IMU, GPS (Global Positioning System), and the like. The camera 612 is a camera for external shooting. A sensor signal and a shooting signal from the camera/sensor unit 61 are outputted to the application processor 67 via the image/signal processing processor 63. In addition, the sensor signal and the shooting signal from the camera/sensor unit 61 are outputted to the application processor 67 and the real-time control processor 66 via the sensor hub 65.

The drive unit 62 includes, for example, a motor controller 621 and a camera gimbal 622.

The control 90 performs control communication with the drone main body 60 as needed. The control 90 performs guidance, etc. of the mobile body 300, for example, in a case where the mobile body 300 approaches a flight prohibition region.

The manual controller 80 is a transmitter that transmits a signal to steer the mobile body 300, and is called a prop (proportional system). The user is able to manually steer the mobile body 300 using the manual controller 80.

The real-time control processor 66 outputs a drive control signal to the drive unit 62 on the basis of a sensor signal or the like inputted via the sensor hub 65 and a control signal or the like from the application processor 67.

The drive unit 62 drives and controls the motor controller 621 and the camera gimbal 622 on the basis of the drive control signal from the real-time control processor 66. The motor controller 621 drives the propeller 51 (FIG. 2) or the like on the basis of the drive control signal. The camera gimbal 622 controls an attitude of the camera 612 on the basis of the drive control signal.

(Configuration of Terminal Apparatus 200)

FIG. 6 schematically illustrates a configuration example of a control system of the terminal apparatus 200 according to the first embodiment.

The terminal apparatus 200 includes a control unit 100, a UI (User Interface) unit 110, a coordinate transformation unit 120, a trajectory planning unit 130, a trajectory linking unit 140, and a communication unit 150.

The UI unit 110 displays a GUI (Graphical User Interface) screen as illustrated in FIG. 15 described later, for example, and accepts (receives), on the GUI screen, an input from a user via a keyboard, a mouse, or the like. The UI unit 110 performs processing to receive, on a predetermined coordinate system, input information including multiple scheduled points of shooting by the camera 612 provided in the mobile body 300 and information on respective camera attitudes at the multiple scheduled shooting points (shooting points). Here, the predetermined coordinate system includes a map coordinate system. For example, the predetermined coordinate system includes a coordinate system of a map displayed on a camera attitude viewer 210, as illustrated in FIGS. 16 to 18 described later. In addition, the predetermined coordinate system includes a self-position coordinate system.

The UI unit 110 corresponds to a specific example of a "reception unit" in the technology of the present disclosure.

The control unit 100 controls each unit of the terminal apparatus 200.

The coordinate transformation unit 120 performs transformation between a camera attitude in the predetermined coordinate system and an airframe attitude of the mobile body 300 in the predetermined coordinate system.

The trajectory planning unit 130 performs processing to create a prior trajectory of the mobile body 300 on the basis of input information accepted (received) by the UI unit 110. The processing to create the prior trajectory may include processing to create a partial trajectory on the basis of a first camera attitude in a first shooting point and a second camera attitude in a second shooting point of the multiple shooting points (see FIGS. 8 to 9 and 17 to 21 described later). In this case, the first camera attitude may be a starting attitude of shooting in the partial trajectory. The second camera attitude may be an ending attitude of the shooting in the partial trajectory. The input information may include shooting time in the first shooting point (starting time of the shooting in the partial trajectory) and shooting time in the second shooting point (ending time of the shooting in the partial trajectory).

The processing to create the partial trajectory by the trajectory planning unit 130 may include performing processing to create multiple trajectory candidates between attitudes of the first camera attitude and the second camera attitude on the basis of a kinetic capability of the mobile body 300 (see FIG. 14 described later).

In addition, the trajectory planning unit 130 performs processing to evaluate whether or not the partial trajectory created by the processing to create a partial trajectory is actually passable by the mobile body 300 (see FIGS. 9 to 13 described later). In a case where the partial trajectory is evaluated by the evaluation processing to be actually unpassable, the trajectory planning unit 130 performs processing to create the partial trajectory again (see FIG. 8 described later). A result of the evaluation (propriety of creation of a trajectory) by the trajectory planning unit 130 is notified to the user via the UI unit 110. In a case where the trajectory planning unit 130 evaluates the partial trajectory to be actually unpassable, the UI unit 110 performs processing to accept (receive) the input information again (see FIG. 8 described later).

The evaluation processing by the trajectory planning unit 130 includes processing to evaluate whether or not a moving direction upon movement through the partial trajectory is actually feasible by the kinetic capability of the mobile body 300 (see FIGS. 9 to 11 described later). In addition, the evaluation processing by the trajectory planning unit 130 includes processing to evaluate whether or not at least one of a speed, acceleration, or jerk upon movement through the partial trajectory is actually feasible by the kinetic capability of the mobile body 300 (see FIGS. 11 to 13 described later).

The trajectory linking unit 140 links multiple partial trajectories created by the trajectory planning unit 130 to create a prior trajectory.

The communication unit 150 transmits the prior trajectory created by the trajectory linking unit 140 to the mobile body 300.

FIG. 7 schematically illustrates an example of a hardware configuration of the terminal apparatus 200 according to the first embodiment.

The terminal apparatus 200 includes a CPU 901 (Central Processing Unit), a ROM 902 (Read Only Memory), a RAM 903 (Random Access Memory), and a bus 905 that couples them together. In addition, the terminal apparatus 200 includes an input device 911, an output device 912, a storage device 913, a drive 914, a coupling port 915, a communication device 916, and an interface 908 that couples them together. In addition, the terminal apparatus 200 includes a bus 906 and a bridge 907 that couple the interface 908 and the bus 905 together. The communication device 916 is able to be coupled by wire or wirelessly to a communication network 920.

The CPU 901, the ROM 902, and the RAM 903 configure a microcomputer. For example, the ROM 902 and the RAM 903 are each configured by a semiconductor storage device, or the like. The program according to the first embodiment may be a program that causes a microcomputer to execute processing by the information processing method according to the first embodiment. The processing by the information processing method according to the first embodiment is implementable by the CPU 901 executing a program stored in the ROM 902 or the RAM 903. It is to be noted that the processing by the information processing method according to the first embodiment may be implemented by the CPU 901 executing processing based on a program supplied from the outside by the communication network 920, for example, by wire or wirelessly.

The input device 911 includes, for example, a keyboard, a pointing device, and the like, and accepts (receives) an input from a user. In addition, the input device 911 includes a camera, a scanner, and the like, and accepts an input of image data, or the like. The output device 912 includes, for example, a display, a speaker, a printer, and the like, and outputs various types of information. The output device 912 displays an image using a display, for example.

The storage device 913 is configured by a hard disk drive, or the like. The drive 914 is configured by an optical drive, or the like. The coupling port 915 is configured by a USB (Universal Serial Bus) terminal, or the like.

1.2 Operation

FIG. 8 schematically illustrates an example of a processing flow of the creation of a prior trajectory by the terminal apparatus 200 according to the first embodiment. Here, description is given by exemplifying processing in which the mobile body 300 is a drone, and the terminal apparatus 200 creates, as a prior trajectory, a prior flight trajectory of a drone.

First, the terminal apparatus 200 sets a value of a parameter n to n=0, and clears a prior flight trajectory T (step S101). Next, the terminal apparatus 200 receives a camera attitude Pcam, n (step S102). Next, the terminal apparatus 200 calculates an airframe attitude Pbody, n (step S103). Here, in a case where the camera 612 (includes a gimbal mechanism that) is able to change attitudes on the airframe, a range of multiple airframe attitude candidates or airframe attitudes may be returned.

After the airframe attitude Pbody, n is calculated (step S103), in a case where the shooting by the camera 612 is directed to a moving image, the terminal apparatus 200 next receives shooting time tn (step S104), and next determines whether or not the value of the parameter n is n=0 (step S105). After the airframe attitude Pbody, n is calculated (step S103), in a case where the shooting by the camera 612 is directed to a still image, the terminal apparatus 200 next determines whether or not the value of the parameter n is n=0 (step S105). In a case where the value of the parameter n is determined to be n=0 (step S105: Y), the terminal apparatus 200 returns to the processing of step S101.

In a case where the value of the parameter n is determined not to be n=0 (step S105: N), the terminal apparatus 200 next plans a partial trajectory Tn−1 from the attitude Pbody, n−1 to the attitude Pbody, n (step S106). Here, in a case where the shooting by the camera 612 is directed to a still image, for example, the shooting is often performed in a state where a drone, if used, is stationary while hovering. Therefore, in the case of the still image, the terminal apparatus 200 may plan a partial trajectory of which a speed is zero at Pbody, n. In a case where the shooting by the camera 612 is directed to a moving image, the terminal apparatus 200 plans a partial trajectory to be punctual to shooting time. Planning algorithms such as search by a Bezier curve, search by a spline curve, and search by A* are considered. As described later, a set of partial trajectories coupling two attitude candidates and ranges together may be planned.

Next, the terminal apparatus 200 determines whether or not there is a solution (step S107). In a case where determination is made that there is no solution (step S107: N), the terminal apparatus 200 notifies that there is no solution (step S108), and then returns to the processing of step S101. Initial values of the camera attitude and the shooting time may be inputted one step before.

In a case where determination is made that there is a solution (step S107: Y), the terminal apparatus 200 adds Tn−1 to the prior flight trajectory T (step S109). Next, the terminal apparatus 200 determines whether or not specifying of the camera attitude has been finished (step S110). In a case where determination is made that the specifying of the camera attitude has not been finished (step S110: N), the terminal apparatus 200 returns to the processing of step S101.

In a case where determination is made that the specifying of the camera attitude has been finished (step S110: Y) and in the case of a moving image, the terminal apparatus 200 plans the partial trajectory Tn until stopping (hovering) (step S111), and then adds Tn to the prior flight trajectory T (step S112). In a case where determination is made that the specifying of the camera attitude has been finished (step S110: Y) and in the case of a still image, the terminal apparatus 200 next adds Tn to the prior flight trajectory T (step S112).

(First Example of Planning of Partial Trajectory Between Attitudes)

FIG. 9 schematically illustrates an example of an operational flow of a first example of planning of the partial trajectory between attitudes (step S106 in FIG. 8).

The terminal apparatus 200 creates the partial trajectory Tn−1 from the attitude Pbody, n−1 to the attitude Pbody, n (step S201). Next, the terminal apparatus 200 evaluates whether the partial trajectory Tn−1 is flyable (step S202).

Next, the terminal apparatus 200 determines whether or not it is flyable as a result of the evaluation (step S203). In a case where determination is made that it is not flyable (step S203: N), the terminal apparatus 200 determines that there is no solution (step S204). In a case where determination is made that it is flyable (step S203: Y), the terminal apparatus 200 determines that there is a solution (step S205). That is, it follows that the solution is the partial trajectory Tn−1.

Here, the method of evaluation as to whether it is flyable in step S202 in FIG. 9 varies depending on a data format of the trajectory.

(Components of Trajectory)

Time

The time may be absolute time or relative time. For example, each of sec and nsec may be expressed by a long type or a double type. In addition, the time may be unspecified.

Position and Attitude

The position and the attitude may be a three-dimensional position and a three-dimensional attitude in a fixed coordinate system. For example, orthogonal coordinates x, y, and z with a takeoff position as the origin, Roll, Pitch, Yaw, latitude, longitude, altitude, NED coordinates, and the like may be adopted. For example, a double-type six-dimensional vector may be adopted. Some or all of attitudes may be unspecified.

Speed

The speed may be a speed (including angular speed) in a fixed coordinate system or an airframe coordinate system. For example, differential values of the above-described position and attitude may be adopted, or those resulting from transformation thereof into another coordinate system may be adopted. For example, a double-type six-dimensional vector may be adopted. Some or all of speeds may be unspecified.

Acceleration

The acceleration may be acceleration (including angular acceleration) in a fixed coordinate system or an airframe coordinate system. A differential value of the above-described speed may be adopted, or those resulting from transformation thereof into another coordinate system may be adopted. For example, a double-type six-dimensional vector may be adopted. Some or all of accelerations may be unspecified.

Jerk

The jerk may be jerk (including angular jerk) in a fixed coordinate system or an airframe coordinate system. A differential value of the above-described acceleration may be adopted, or those resulting from transformation thereof into another coordinate system may be adopted. For example, a double six-dimensional vector may be adopted. Some or all of jerks may be unspecified.

Continuous Trajectory

For example, the continuous trajectory is expressed by a function using a parameter for each element. The parameter may be time, or may be a non-dimensional variable.

Discrete Trajectory

The discrete trajectory is expressed, for example, by an arrangement of airframe information including each element.

(Method of Evaluation of Partial Trajectory)

The terminal apparatus 200 generates a trajectory between two attitudes, for example, for evaluation. This is a method called a mathematical method to interpolate variables using a function such as Bezier or spline. Evaluation is made as to whether the generated partial trajectory is flyable. For example, the evaluation is made as illustrated in Evaluations 1 to 4 described below. In a case where all of the generated partial trajectories are unflyable, it is assumed that there is no solution.

Evaluation 1 (Evaluation as to Whether Moving Direction Is Feasible)

For example, evaluation is made as to whether or not the constraint concerning propriety of movement in each direction of translations x, y, and z and in each direction of rotations r, p, and y is observed. For example, a typical drone only has degrees of freedom of z, r, p, and y, and thus a partial trajectory allowing for translation in x and y while keeping the same attitude is unflyable.

Evaluation 2 (Evaluation as to Whether Movement Speed Is Feasible)

For example, evaluation is made as to whether or not a speed in each direction is within a range of an airframe capability. For example, an airframe having a maximum climbing speed of 10 m/s is not able to move up 100 m in one second.

Evaluation 3 (Evaluation as to Whether Acceleration Is Feasible)

For example, evaluation is made as to whether or not the acceleration in each direction is within a range of the airframe capability. For example, even an airframe having a maximum climbing speed of 10 m/s is not able to move up one meter in one second (only able to climb up to 0.5 m) from a stationary status, when the maximum climbing acceleration is 1 m/s$^2$.

Evaluation 4 (Evaluation as to Whether Jerk Is Feasible)

For example, evaluation is made as to whether or not the jerk in each direction is within a range of the airframe capability.

FIG. 10 schematically illustrates an example of a flow of a method of evaluation as to whether the partial trajectory is flyable (step S202 in FIG. 9).

The terminal apparatus 200 determines whether or not the trajectory is expressed as a parameter (step S211). In a case where the trajectory is determined to be expressed as a parameter (step S211: Y), the terminal apparatus 200 next determines whether or not the parameter is time (step S212). In a case where the parameter is determined to be time (step S212: Y), the terminal apparatus 200 next evaluates flyability of the continuous trajectory (step S214). In a case where the parameter is determined not to be time (step S212: N), the terminal apparatus 200 next evaluates a trajectory shape (step S215).

In a case where the trajectory is determined not to be expressed as a parameter (step S211: N), the terminal apparatus 200 next determines whether or not the trajectory is an arrangement of airframe information (step S213). In a case where the trajectory is determined to be the arrangement of airframe information (step S213: Y), the terminal apparatus 200 next evaluates flyability of the discrete trajectory (step S216). In a case where the trajectory is determined not to be the arrangement of airframe information (step S213: N), the terminal apparatus 200 determines that the trajectory is out of the evaluation target (step S217).

FIG. 11 schematically illustrates an example of a flow of processing of the evaluation of the trajectory shape (step S215 in FIG. 10).

The terminal apparatus 200 determines a speed by differentiating the position and the attitude with respect to the parameter (step S221). Next, the terminal apparatus 200 determines whether or not the speed is within a finite range (step S222). In a case where the speed is determined to be within the finite range (step S222: Y), the terminal apparatus 200 determines that it is flyable (step S223). In a case where the speed is determined not to be within the finite range (step S222: N), the terminal apparatus 200 determines that it is unflyable (step S224).

FIG. 12 schematically illustrates an example of a flow of the evaluation as to whether the continuous trajectory is flyable (step S214 in FIG. 10).

The terminal apparatus 200 determines whether or not there is speed information (step S231). In a case where determination is made that there is no speed information (step S231: N), the terminal apparatus 200 next determines a speed by differentiating the position and the attitude with respect to time (step S238), and proceeds to processing of step S232.

In a case where determination is made that there is speed information (step S231: Y), the terminal apparatus 200 next determines whether or not the speed is within a range of the airframe capability (step S232). In a case where the speed is determined not to be within a range of the airframe capability (step S232: N), the terminal apparatus 200 determines that it is unflyable (step S239).

In a case where the speed is determined to be within a range of the airframe capability (step S232: Y), the terminal apparatus 200 next determines whether or not there is acceleration information (step S233). In a case where determination is made that there is no acceleration information (step S233: N), the terminal apparatus 200 next determines acceleration by differentiating the speed with respect to time (step S240), and proceeds to processing in step S234.

In a case where determination is made that there is acceleration information (step S233: Y), the terminal apparatus 200 next determines whether or not the acceleration is within a range of the airframe capability (step S234). In a case where the acceleration is determined not to be within a range of the airframe capability (step S234: N), the terminal apparatus 200 determines that it is unflyable (step S241).

In a case where the acceleration is determined to be within a range of the airframe capability (step S234: Y), the terminal apparatus 200 next determines whether or not there is jerk information (step S235). In a case where determination is made that there is no jerk information (step S235: N), the terminal apparatus 200 next determines jerk by differentiating the acceleration with respect to time (step S242), and proceeds to processing in step S236.

In a case where determination is made that there is jerk information (step S235: Y), the terminal apparatus 200 next determines whether or not the jerk is within a range of the airframe capability (step S236). In a case where the jerk is determined not to be within a range of the airframe capability (step S236: N), the terminal apparatus 200 determines that it is unflyable (step S243). In a case where the jerk is determined to be within a range of the airframe capability (step S236: Y), the terminal apparatus 200 determines that it is flyable (step S237).

FIG. 13 schematically illustrates an example of a flow of evaluation as to whether the discrete trajectory is flyable (step S216 in FIG. 10).

The terminal apparatus 200 determines whether or not there is speed information (step S251). In a case where determination is made that there is no speed information (step S251: N), the terminal apparatus 200 next determines whether or not there is time information (step S258). In a case where determination is made that there is no time information (step S258: N), the terminal apparatus 200 next proceeds to processing in step S253. In a case where determination is made that there is time information (step S258: Y), the terminal apparatus 200 next determines a speed from anteroposterior positional information (step S259), and proceeds to processing in step S252.

In a case where determination is made that there is speed information (step S251: Y), the terminal apparatus 200 next determines whether or not the speed is within a range of the airframe capability (step S252). In a case where the speed is determined not to be within a range of the airframe capability (step S252: N), the terminal apparatus 200 determines that it is unflyable (step S260).

In a case where the speed is determined to be within a range of the airframe capability (step S252: Y), the terminal apparatus 200 next determines whether or not there is acceleration information (step S253). In a case where determination is made that there is no acceleration information (step S253: N), the terminal apparatus 200 next determines whether or not there are time information and speed information (step S261). In a case where determination is made that there are no time information and no speed information (step S261: N), the terminal apparatus 200 next proceeds to processing in step S255. In a case where determination is made that there are time information and speed information (step S261: Y), the terminal apparatus 200 next determines acceleration from anteroposterior speed information (step S262), and proceeds to processing in step S254.

In a case where determination is made that there is acceleration information (step S253: Y), the terminal apparatus 200 next determines whether or not the acceleration is within a range of the airframe capability (step S254). In a case where the acceleration is determined not to be within a range of the airframe capability (step S254: N), the terminal apparatus 200 determines that it is unflyable (step S263).

In a case where the acceleration is determined to be within a range of the airframe capability (step S254: Y), the terminal apparatus 200 next determines whether or not there is jerk information (step S255). In a case where determination is made that there is no jerk information (step S255: N), the terminal apparatus 200 next determines whether or not there are time information and acceleration information (step S264). In a case where determination is made that there are no time information and acceleration information (step S264: N), the terminal apparatus 200 determines that it is flyable (step S257). In a case where determination is made that there are time information and acceleration information (step S264: Y), the terminal apparatus 200 next determines jerk from anteroposterior acceleration information (step S265), and proceeds to processing in step S256.

In a case where determination is made that there is jerk information (step S255: Y), the terminal apparatus 200 next determines whether or not the jerk is within a range of the airframe capability (step S256). In a case where the jerk is determined not to be within a range of the airframe capability (step S256: N), the terminal apparatus 200 determines that it is unflyable (step S266). In a case where the jerk is determined to be within a range of the airframe capability (step S256: Y), the terminal apparatus 200 determines that it is flyable (step S257).

(Second Example of Planning of Partial Trajectory Between Attitudes)

The terminal apparatus 200 may use, for example, a method referred to as a searching method such as A*, RRT, or Dijkstra to generate a partial trajectory within a range of a kinetic capability of the airframe. For example, with the starting attitude as a starting point, many candidates of micro trajectories contained within a range of the kinetic capability are generated therefrom and linked together, which are repeated; thus, searching is performed as to whether to be able to reach a target attitude. In this case, evaluation is made sequentially, and thus presence or absence of a solution depends on whether or not to be able to reach the target attitude.

FIG. 14 schematically illustrates an example of an operational flow of a second example of the planning of the partial trajectory between attitudes (step S106 in FIG. 8).

The terminal apparatus 200 adds the attitude Pbody, n−1 to an attitude set P to be searched (step S301). Next, the terminal apparatus 200 determines whether or not there is an element in the set P to be searched (step S302). In a case where determination is made that there is no element (step S302: N), the terminal apparatus 200 determines that there is no solution (step S303).

In a case where determination is made that there is an element (step S302: Y), the terminal apparatus 200 next extracts a candidate p from the attitude set P to be searched (step S304). Next, the terminal apparatus 200 determines a set A of control inputs executable at an attitude p (step S305).

Next, the terminal apparatus 200 determines whether or not there is an element in the set A of control inputs (step S306). In a case where determination is made that there is no element (step S306: N), the terminal apparatus 200 returns to the processing in step S302.

In a case where determination is made that there is an element (step S306: Y), the terminal apparatus 200 next extracts a candidate a from the set A of control inputs (step S307). Next, the terminal apparatus 200 determines an attitude p' after a control input a having been inputted to the attitude p during micro time Δt (step S308). Next, the terminal apparatus 200 determines a difference D between the attitude p' and the target attitude Pbody, n (step S309).

Next, the terminal apparatus 200 determines whether or not the difference D is equal to or less than a threshold value (step S310). In a case where determination is made that the value is not equal to or less than the threshold value (step S310: N), the terminal apparatus 200 determines that there is a solution (step S311). The terminal apparatus 200 assumes that the solution is a set of attitudes from the attitude Pbody, n−1 to Pbody, n.

In a case where determination is made that the value is equal to or less than the threshold value (step S310: Y), the terminal apparatus 200 next associates the attitude p' with p, and adds it to the attitude set P to be searched (step S312), and then returns to the processing in step S306.

1.3 Specific Example of Creation of Prior Trajectory

The terminal apparatus 200 may accept (receive) specifying of a camera attitude from a user, for example, on a GUI (Graphical User Interface) displayed by the UI unit 110. The terminal apparatus 200 may display a registration button to specify a shooting point on the GUI, for example. In the case of a moving image, the terminal apparatus 200 may display to enable shooting time to be set on the GUI.

In a case where a partial trajectory that is unfeasible is specified by the user, the terminal apparatus 200 may display on the GUI to notify that it is unfeasible. For example, an error may be displayed on the GUI when a shooting point is registered. In addition, for example, in a case where a zone without a solution (not punctual to shooting time) is specified, the color of the zone may be changed. For example, the color of the shooting point not punctual to the shooting time may be changed on the GUI. In addition, for example, a trajectory with a changed speed may be proposed on the GUI. For example, a bar may be displayed thinly on a proposed shooting time on a seek bar on the GUI.

FIG. 15 schematically illustrates an example of an initial screen of a GUI screen for the creation of a prior trajectory by the terminal apparatus 200 according to the first embodiment. The UI unit 110 of the terminal apparatus 200 displays a GUI screen as illustrated in FIG. 15, for example, and accepts (receives) an input from a user via a keyboard, a mouse, or the like on the GUI screen. For example, settings such as steps 1 to 4 illustrated in FIGS. 16 to 19 described later are accepted in order.

As illustrated in FIG. 15, the GUI screen for the creation of the prior trajectory includes the camera attitude viewer 210, an expected camera image viewer 220, and a shooting time adjustment panel 230.

The camera attitude viewer 210 and a periphery thereof are provided with a map setting button 213, a shooting point addition button 214, scaling buttons 211, and translatory and rotatory buttons 212.

The expected camera image viewer 220 is provided with the scaling buttons 221 and the translatory and rotatory buttons 222.

The shooting time adjustment panel 230 includes a camera position/attitude information display section 231 and a shooting point bar 232.

FIG. 16 schematically illustrates a screen example in a stage (step 1) of setting a map using the GUI screen illustrated in FIG. 15.

When the user clicks on the map setting button 213, the UI unit 110 displays a place name input box 240 in a pop-up manner. When the user inputs a place name and an address in the place name input box 240, the UI unit 110 displays a relevant map of the place name and the address on the camera attitude viewer 210.

FIG. 17 schematically illustrates a screen example in a stage (step 2) of additional setting of a shooting point using the GUI screen illustrated in FIG. 15.

Next, when the user clicks on the shooting point addition button 214, the UI unit 110 displays a camera icon 250 on the map displayed on the camera attitude viewer 210. At this time, the UI unit 110 additionally displays the shooting point bar 232 on a time series of the shooting time adjustment panel 230. In addition, the UI unit 110 displays information on a position and an attitude of the camera icon 250 on the camera position/attitude information display section 231 of the shooting time adjustment panel 230. In addition, the UI unit 110 displays, on the expected camera image viewer 220, a captured image expected from a position and an attitude specified by the camera icon 250.

FIG. 18 schematically illustrates a screen example in a stage (step 3) of setting a shooting position and a shooting attitude using the GUI screen illustrated in FIG. 15.

The user is able to adjust the shooting position and the shooting attitude by moving or rotating (adjusting a position or a yaw angle) the camera icon 250, from the state illustrated in FIG. 17, on the map displayed on the camera attitude viewer 210, as illustrated in FIG. 18. In addition, the user is able to adjust up/down (pitch angle), left/right (yaw angle), and rotation (roll angle) shooting attitudes from a camera viewpoint while viewing an expected captured image displayed on the expected camera image viewer 220, by using the scaling buttons 221 and the translatory and rotatory buttons 222. In addition, the user is also able to adjust the shooting position and the shooting attitude by directly inputting variables of the shooting position and the shooting attitude to the camera position/attitude information display section 231 on the shooting time adjustment panel 230.

FIG. 19 schematically illustrates a screen example in a stage (step 4) of setting adjustment of the shooting time using the GUI screen illustrated in FIG. 15.

The user is able to adjust the shooting time by moving the shooting point bar 232 from the state illustrated in FIG. 18 on the time series displayed on the shooting time adjustment panel 230. It is to be noted that a starting point of the shooting time is fixed at 00:00.

FIG. 20 schematically illustrates a screen example in a stage where the settings of the steps 2 to 4 (FIGS. 17 to 19) are repeated using the GUI screen illustrated in FIG. 15.

Repeating the settings of the steps 2 to 4 (FIGS. 17 to 19) allows information on the partial trajectory to be displayed on the camera attitude viewer 210 and the shooting time adjustment panel 230, as illustrated in FIG. 20.

FIG. 21 schematically illustrates an example of the prior trajectory created using the GUI screen illustrated in FIG. 15.

Repeating the settings of the steps 2 to 4 (FIGS. 17 to 19) allows information on a final shooting trajectory in which multiple partial trajectories are coupled to be finally displayed on the camera attitude viewer 210 and the shooting time adjustment panel 230, as illustrated in FIG. 21. This shooting trajectory serves as the prior trajectory.

1.4 Effects

As described above, according to the information processing method, the information processor, and the program of the first embodiment, a prior trajectory of the mobile body 300 is created on the basis of input information including information on respective camera attitudes at the multiple scheduled shooting points, thus making it possible to easily create trajectory planning of the mobile body.

According to the information processing method, the information processor, and the program of the first embodiment, it is possible to create and edit a prior trajectory in such a sense as to freely move the camera 612 without requiring knowledge of an airframe capability of the mobile body 300. At this time, it is possible to create and edit the prior trajectory to allow for smooth transition of a shooting viewpoint between multiple specified shooting points (shooting viewpoints and times). It is guaranteed that the created prior trajectory is feasible (actually passable) by the mobile body 300.

It is to be noted that the effects described herein are merely illustrative and not limiting, and there may be other effects as well. The same applies to effects of the following other embodiments.

2. Other Embodiments

The technology according to the present disclosure is not limited to the descriptions of the respective embodiments described above, and may be modified in a wide variety of ways.

For example, the present technology may also have the following configurations.

According to the present technology of the following configurations, the prior trajectory of the mobile body is created on the basis of input information including information on the respective camera attitudes at the multiple scheduled shooting points, thus making it possible to easily create trajectory planning of the mobile body.

(1)
An information processing method including:
  performing processing to receive, on a predetermined coordinate system, input information including multiple scheduled points of shooting by a camera provided in a mobile body and information on respective camera attitudes at the multiple scheduled shooting points; and performing processing to create a prior trajectory of the mobile body on a basis of the received input information.

(2)

The information processing method according to (1), in which the processing to create the prior trajectory includes processing to create a partial trajectory on a basis of a first camera attitude at a first scheduled shooting point and a second camera attitude at a second scheduled shooting point, among the multiple scheduled shooting points.

(3)

The information processing method according to (2), further including performing processing to evaluate whether or not the partial trajectory created by the processing to create the partial trajectory is actually passable by the mobile body.

(4)

The information processing method according to (3), further including performing processing to create the partial trajectory again in a case where the partial trajectory is evaluated by the evaluation processing to be actually unpassable.

(5)

The information processing method according to (3) or (4), further including performing processing to receive the input information again in a case where the partial trajectory is evaluated by the evaluation processing to be actually unpassable.

(6)

The information processing method according to any one of (3) to (5), in which the evaluation processing includes processing to evaluate whether or not a moving direction upon movement through the partial trajectory is actually feasible by a kinetic capability of the mobile body.

(7)

The information processing method according to any one of (3) to (6), in which the evaluation processing includes processing to evaluate whether or not at least one of a speed, acceleration, or jerk upon the movement through the partial trajectory is actually feasible by the kinetic capability of the mobile body.

(8)

The information processing method according to (2), in which the processing to create the partial trajectory includes performing processing to create multiple trajectory candidates between attitudes of the first camera attitude and the second camera attitude, on a basis of a kinetic capability of the mobile body.

(9)

The information processing method according to any one of (1) to (8), in which the predetermined coordinate system includes a map coordinate system.

(10)

The information processing method according to any one of (1) to (9), in which the predetermined coordinate system includes a self-position coordinate system.

(11)

An information processor including:
a reception unit that receives, on a predetermined coordinate system, input information including multiple scheduled points of shooting by a camera provided in a mobile body and information on respective camera attitudes at the multiple scheduled shooting points; and a trajectory planning unit that creates a prior trajectory of the mobile body on a basis of the received input information.

(12)

A program that causes a computer to execute processing, the processing including:
performing processing to receive, on a predetermined coordinate system, input information including multiple scheduled points of shooting by a camera provided in a mobile body and information on respective camera attitudes at the multiple scheduled shooting points; and performing processing to create a prior trajectory of the mobile body on a basis of the received input information.

This application claims the benefit of Japanese Priority Patent Application JP2020-39276 filed with the Japan Patent Office on Mar. 6, 2020, the entire contents of which are incorporated herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. An information processing method, comprising:
receiving, on a specific coordinate system, input information including:
a first information corresponding to multiple scheduled points of shooting by a camera in a mobile body, and
a second information corresponding to respective camera attitudes at the multiple scheduled points of shooting;
creating a prior trajectory of the mobile body based on the received input information, wherein the creation of the prior trajectory includes creation of a partial trajectory based on
a first camera attitude at a first scheduled point of shooting of the multiple scheduled points of shooting, and
a second camera attitude at a second scheduled point of shooting of the multiple scheduled points of shooting;
evaluating that the created partial trajectory is passable by the mobile body, wherein
the evaluation includes a determination that a moving direction, based on a movement through the partial trajectory, is passable by a kinetic capability of the mobile body; and
controlling a drive mechanism of the mobile body based on the evaluation.

2. The information processing method according to claim 1, further comprising: creating the partial trajectory based on a determination that the partial trajectory is evaluated as unpassable.

3. The information processing method according to claim 1, further comprising: receiving the input information based on a determination that the partial trajectory is evaluated as unpassable.

4. The information processing method according to claim 1, wherein the evaluation includes processing to evaluate that at least one of a speed, acceleration, or jerk upon movement through the partial trajectory is passable by the kinetic capability of the mobile body.

5. The information processing method according to claim 1, wherein the creation of the partial trajectory includes creation of multiple trajectory candidates between a plurality of attitudes of the first camera attitude and the second camera attitude, based on the kinetic capability of the mobile body.

6. The information processing method according to claim 1, wherein the specific coordinate system includes a map coordinate system.

7. The information processing method according to claim 1, wherein the specific coordinate system includes a self-position coordinate system.

8. An information processing device, comprising:
a memory; and
a central processing unit (CPU) configured to;
  receive, on a specific coordinate system, input information including:
    a first information corresponding to multiple scheduled points of shooting by a camera in a mobile body, and
    a second information corresponding to respective camera attitudes at the multiple scheduled points of shooting;
  create a prior trajectory of the mobile body based on the received input information, wherein the creation of the prior trajectory includes creation of a partial trajectory based on
    a first camera attitude at a first scheduled point of shooting of the multiple scheduled points of shooting, and
    a second camera attitude at a second scheduled point of shooting of the multiple scheduled points of shooting;
  evaluate that the created partial trajectory is passable by the mobile body, wherein
    the evaluation includes a determination that a moving direction, based on a movement through the partial trajectory, is passable by a kinetic capability of the mobile body; and
  control a drive mechanism of the mobile body based on the evaluation.

9. A non-transitory computer-readable medium having stored thereon, computer-executable instructions which, when executed by a computer, cause the computer to execute operations, the operations comprising:
  receiving, on a specific coordinate system, input information including:
    a first information corresponding to multiple scheduled points of shooting by a camera in a mobile body, and
    a second information corresponding to respective camera attitudes at the multiple scheduled points of shooting;
  creating a prior trajectory of the mobile body based on the received input information, wherein the creation of the prior trajectory includes creation of a partial trajectory based on
    a first camera attitude at a first scheduled point of shooting of the multiple scheduled points of shooting, and
    a second camera attitude at a second scheduled shooting point of shooting of the multiple scheduled points of shooting;
  evaluating that the created partial trajectory is passable by the mobile body, wherein
    the evaluation includes a determination that a moving direction, based on a movement through the partial trajectory, is passable by a kinetic capability of the mobile body; and
  controlling a drive mechanism of the mobile body based on the evaluation.

* * * * *